US012150456B2

(12) United States Patent
Fogarty et al.

(10) Patent No.: US 12,150,456 B2
(45) Date of Patent: Nov. 26, 2024

(54) CRUSTACEAN BUTCHERING APPARATUS

(71) Applicant: AREA52 LTD, Lutes Mountain (CA)

(72) Inventors: Tim Fogarty, Lutes Mountain (CA); Joel Devito, Lower Coverdale (CA)

(73) Assignee: AREA52 LTD, Lutes Mountain (CA)

( * ) Notice: Subject to any disclaimer, the term of this patent is extended or adjusted under 35 U.S.C. 154(b) by 19 days.

(21) Appl. No.: 18/199,108

(22) Filed: May 18, 2023

(65) Prior Publication Data

US 2023/0371533 A1 Nov. 23, 2023

Related U.S. Application Data

(60) Provisional application No. 63/344,101, filed on May 20, 2022.

(51) Int. Cl.
*A22C 29/00* (2006.01)
*A22C 29/02* (2006.01)

(52) U.S. Cl.
CPC .......... *A22C 29/025* (2013.01); *A22C 29/023* (2013.01)

(58) Field of Classification Search
CPC ........................................... A22C 29/023–026
USPC ............................................................ 452/1
See application file for complete search history.

(56) References Cited

U.S. PATENT DOCUMENTS

| 3,696,466 A | * | 10/1972 | Letchworth | A22C 29/026 452/179 |
| 5,839,952 A | * | 11/1998 | Pollingue | A22C 29/026 452/8 |
| 6,099,399 A | * | 8/2000 | Hearn | A22C 29/00 452/1 |

* cited by examiner

*Primary Examiner* — Richard T Price, Jr.
(74) *Attorney, Agent, or Firm* — SMART & BIGGAR LP; Nicholas Aitken

(57) ABSTRACT

A crustacean butchering apparatus is disclosed. The crustacean butchering apparatus may include at least one carapace grip sized to secure a carapace of a crustacean to a conveyor. When activated, the conveyor carries the crustacean secured by the carapace grip in a machine direction along a processing path. A plurality of tools may be placed along the processing path for butchering the crustacean. Optionally, a claw removing tool may be positioned along the processing path. When activated, the claw removing tool separates at least one claw of the crustacean from the carapace of the crustacean. Optionally, a tail removing tool may be positioned along the processing path. When activated, the tail removing tool may separate a tail of the crustacean from the carapace of the crustacean.

20 Claims, 39 Drawing Sheets

CRUSTACEAN BUTCHERING APPARATUS

CROSS-REFERENCE TO RELATED APPLICATIONS

The present application claims the benefit of priority from U.S. Patent Application No. 63/344,101 filed May 20, 2022, the contents of which are incorporated by reference in their entirety.

FIELD

The field of the invention relates to crustacean butchering apparatuses.

INTRODUCTION

Crustaceans, such as lobsters and crabs, are often butchered by scores of workers that manually break down the crustaceans by hand, to separate, for example, the tails and claws of the crustacean from the carapace of the crustacean. This butchering method however is labor intensive and increasingly expensive. Accordingly, it may be desirable to provide an apparatus that can automate and improve upon the butchering of crustaceans.

SUMMARY

In one aspect, a crustacean butchering apparatus is provided. The crustacean butchering apparatus may comprise (a) at least one carapace grip, each carapace grip of the at least one carapace grip sized to secure a carapace of a crustacean to a conveyor, when activated the conveyor carries the crustacean secured by the carapace grip in a machine direction along a processing path; (b) a claw removing tool positioned along the processing path, when activated the claw removing tool separates a first claw and a second claw of the crustacean from the carapace of the crustacean; and (c) a tail removing tool positioned along the processing path, when activated the tail removing tool separates a tail of the crustacean from the carapace of the crustacean.

In another aspect another example of a crustacean butchering apparatus may be provided which comprises (a) at least one carapace grip, each carapace grip of the at least one carapace grip sized to secure a carapace of a crustacean to a conveyor, when activated the conveyor carries the crustacean secured by the carapace grip in a machine direction along a processing path; and (b) a tail removing tool positioned along the processing path, the tail removing tool having a tail pulling slot extending in the machine direction from an upstream slot end to a downstream slot end and having a slot height sized to pinch the crustacean between the tail and the carapace, the slot height being transverse to the machine direction and a cross-machine direction, the slot height measured from a slot proximal side to a slot distal side, the slot proximal side being closer to the conveyor than the conveyor is to the slot distal side, a distance between the slot proximal side and the conveyor increases between the upstream slot end and the downstream slot end, when activated the tail removing tool separates a tail of the crustacean from the carapace of the crustacean.

DRAWINGS

For a better understanding of the described embodiments and to show more clearly how they may be carried into effect, reference will now be made, by way of example, to the accompanying drawings in which.

Figure 1A:
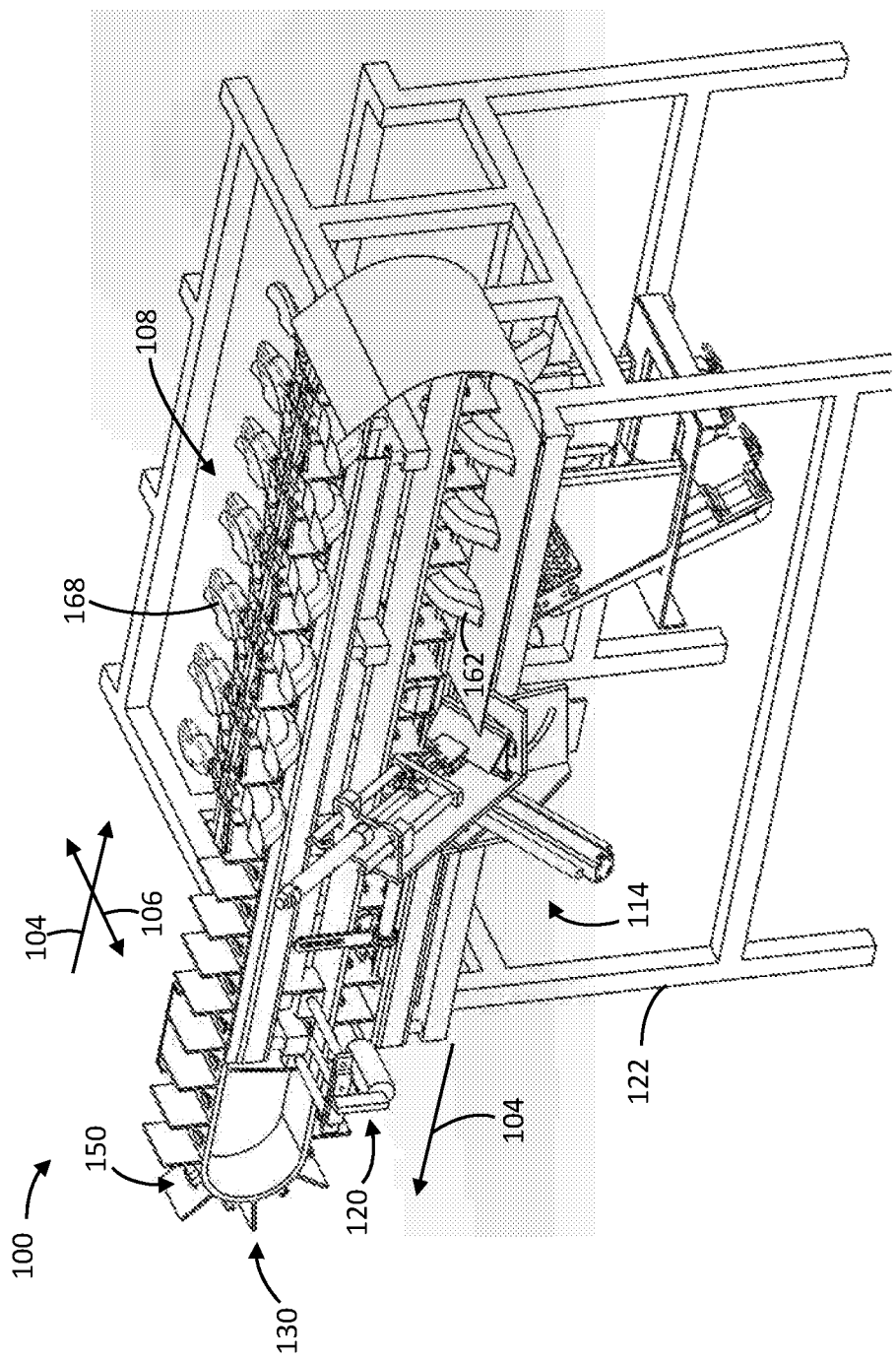
FIG. 1A is a front perspective view of a crustacean butchering apparatus.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Numerous embodiments are described in this application and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

As used herein and in the claims, a group of elements are said to "collectively" perform an act where that act is performed by any one of the elements in the group, or performed cooperatively by two or more (or all) elements in the group.

As used herein and in the claims, a first line or axis is said to be "perpendicular" to a second line or axis in three dimensional space when the second line or axis is parallel to or collinear with an imaginary line that intersects the first line at a 90 degree angle, or within an angle of about 5 degrees of parallel to or collinear with the imaginary line.

As used herein and in the claims, a first element is said to extend "transverse" to a second element, where the first element extends within 45 degrees of perpendicular to the second element.

Some elements herein may be identified by a part number, which is composed of a base number followed by an alphabetical or subscript-numerical suffix (e.g., 112a, or $112_1$). Multiple elements herein may be identified by part numbers that share a base number in common and that differ by their suffixes (e.g., $112_1$, $112_2$, and $112_3$). All elements with a common base number may be referred to collectively or generically using the base number without a suffix (e.g., 112).

It should be noted that terms of degree such as "substantially", "about", and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

The term "crustacean" includes but is not limited to crab, lobster, shrimp, crayfish, krill, and prawns.

The term "carapace" means the armor-like dorsal section of the crustacean with or without, for example, the legs, claws, tail, head, etc. of the crustacean attached thereto. Before it is removed from the "carapace", within the "carapace" is the body of the crustacean.

General Description of a Crustacean Butchering Apparatus

A crustacean butchering apparatus 100 is operable to butcher (i.e., break-down into separated parts) crustaceans. To do so, the crustacean butchering apparatus 100 may include a plurality of tools which may be placed along a processing path 102 and are operable to butcher the crustaceans.

The select plurality of tools placed along the processing path 102 may vary depending on the type(s) of crustacean(s) to be butchered. For example, a crustacean processing facility may only butcher crab and therefore not require a crustacean butchering apparatus 100 including a tool for removing a tail of the crustacean. As a second example, a crustacean processing facility may butcher both crab and lobster. In this example, the facility may require a crustacean butchering apparatus 100 including a tool for removing the tail of the crustacean. Optionally, this tool may be operable when the crustacean butchering apparatus 100 is used for butchering lobster and may be put out of service (i.e., disabled or deactivated) when the crustacean butchering apparatus 100 is used to butcher crab.

Therefore, while the drawings illustrate specific examples of crustacean butchering apparatuses 100 for butchering crustaceans (e.g., lobsters 108), these examples are not meant to be limiting. It is to be understood that a crustacean butchering apparatus 100 may include any combination of the tools that are described in detail below. That is, depending on the desired use of the crustacean butchering apparatus 100, the crustacean butchering apparatus 100 may include all of the following tools or may include a subset of the following tools (i.e., may exclude one or more of the following tools): (a) a claw elastic stripping tool 110; (b) a claw removing tool 112; (c) a claw sorter 113; (d) a tail removing tool 114; (e) a tomalley removing tool 116; (f) a body ejection tool 118; and (g) a carapace ejection tool 120.

The select plurality of tools that are placed along the processing path 102 may be dependent on factors other than the type(s) of crustacean(s) to be butchered. For example, a first crustacean processing facility may require claw elastics to be stripped during the butchering process whereas a second crustacean processing facility may leave claw elastics in place or may process crustaceans that are without claw elastics.

While the figures depict examples of crustacean butchering apparatuses 100 with exemplary tools placed in a particular order, it is to be understood that unless otherwise specified, the tools may be placed along the processing path 102 in any order. For example, the claw removing tool 112 may be placed upstream, downstream, or in parallel with the tail removing tool 114.

It is also to be understood that while the drawings and description that follow may position tools along the processing path 102 relative to a frame 122 of the crustacean butchering apparatus 100, the crustacean butchering apparatus 100 might not have a frame 122 as commonly understood or may have multiple frames.

Figure 3A:
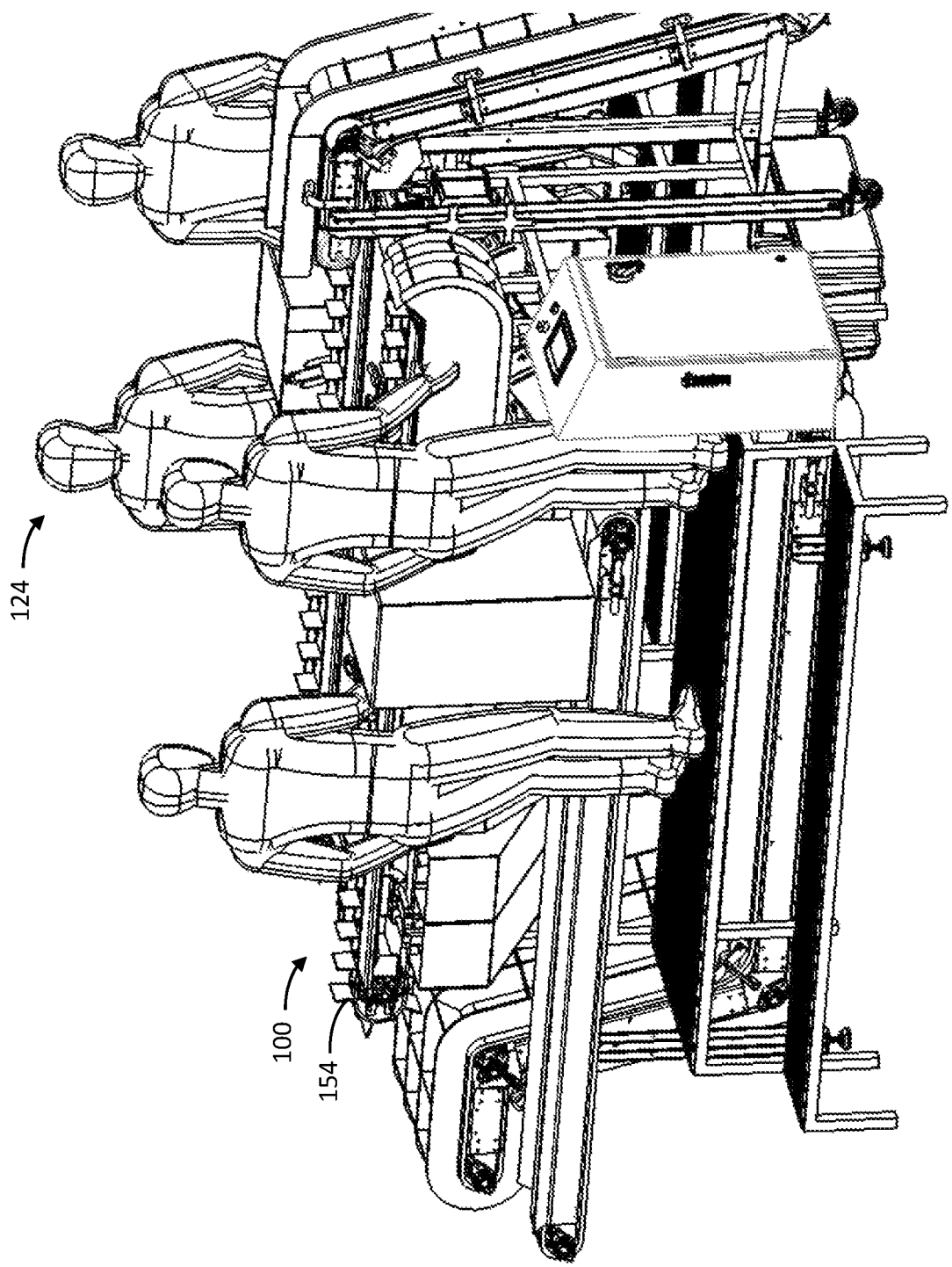
FIG. 3A is a front perspective view of an alternative embodiment of a crustacean butchering apparatus, shown with a plurality of operators operating the crustacean butchering apparatus.

Further, it is to be understood that the crustacean butchering apparatuses 100 described herein may operate with or without human interaction. For example, as shown in FIG. 3A, operators 124 may load the crustaceans to be butchered onto the crustacean butchering apparatus 100. However, it will be appreciated that the crustaceans to be butchered may be mechanically loaded onto the crustacean butchering apparatus 100 (e.g., dropped from a hopper).

Conveyor

Figure 1B:
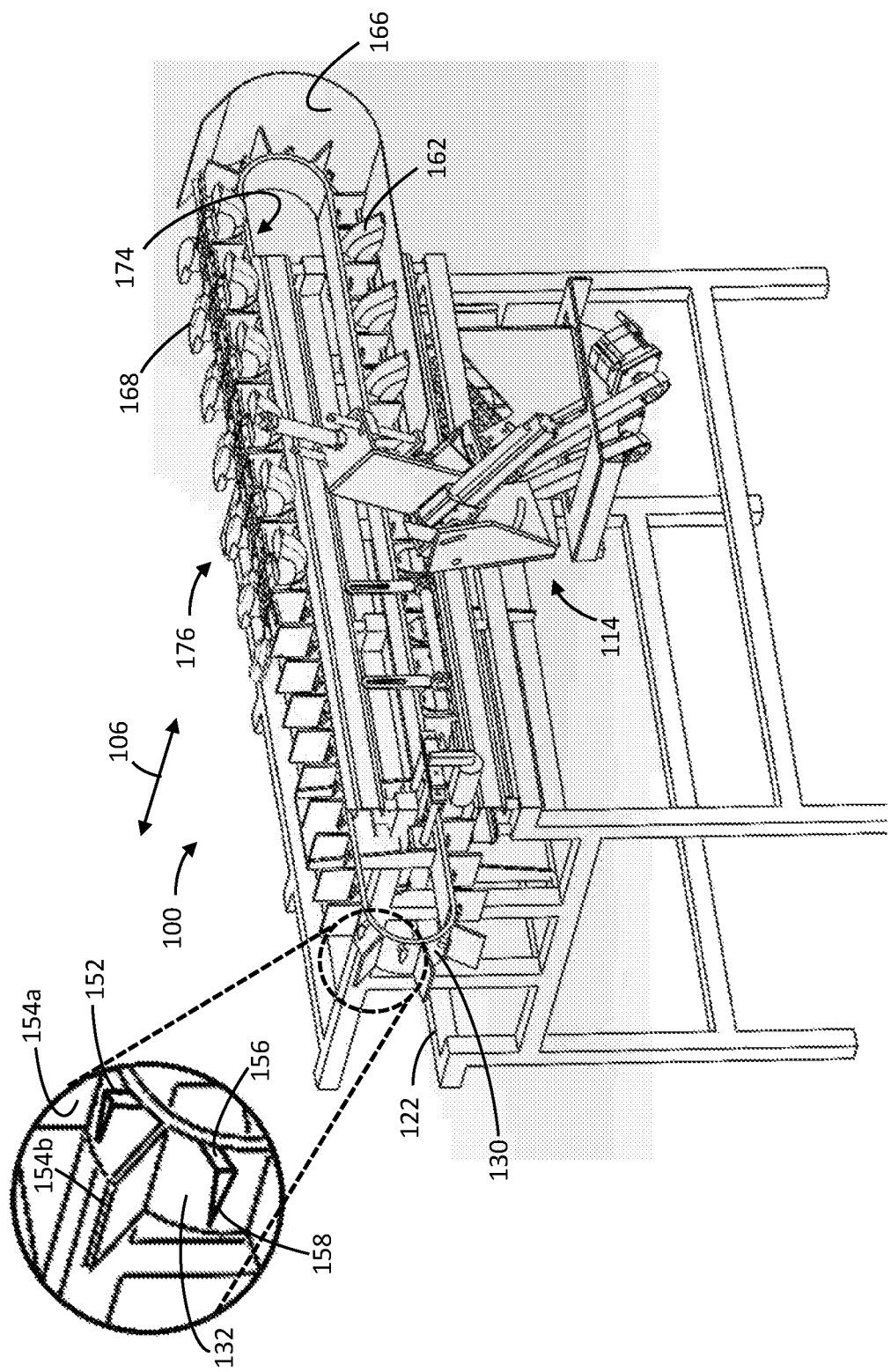
FIG. 1B is a rear perspective view of the crustacean butchering apparatus of FIG. 1A.
Figure 1C:
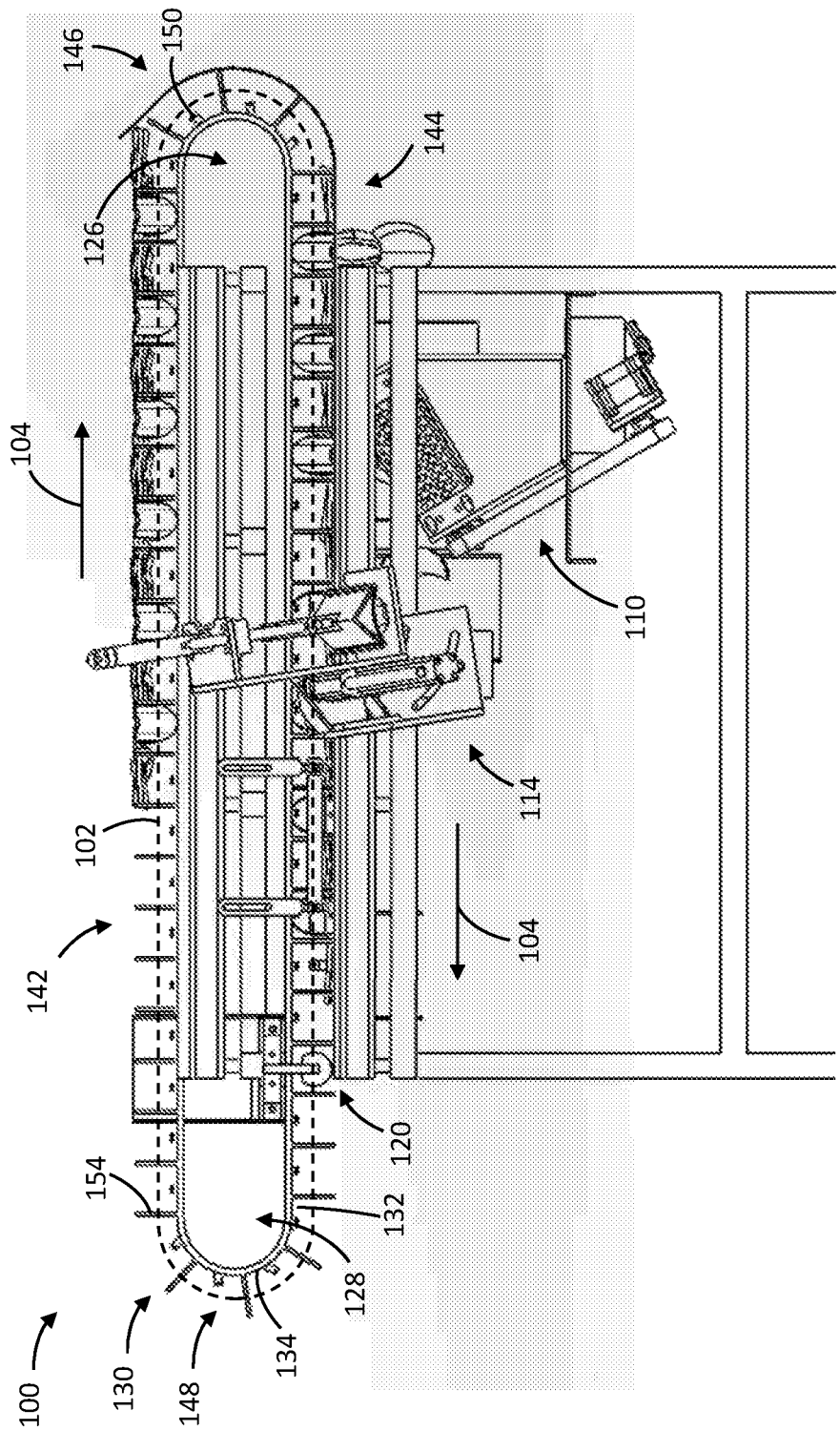
FIG. 1C is a side view of the crustacean butchering apparatus of FIG. 1A.
Figure 1A:
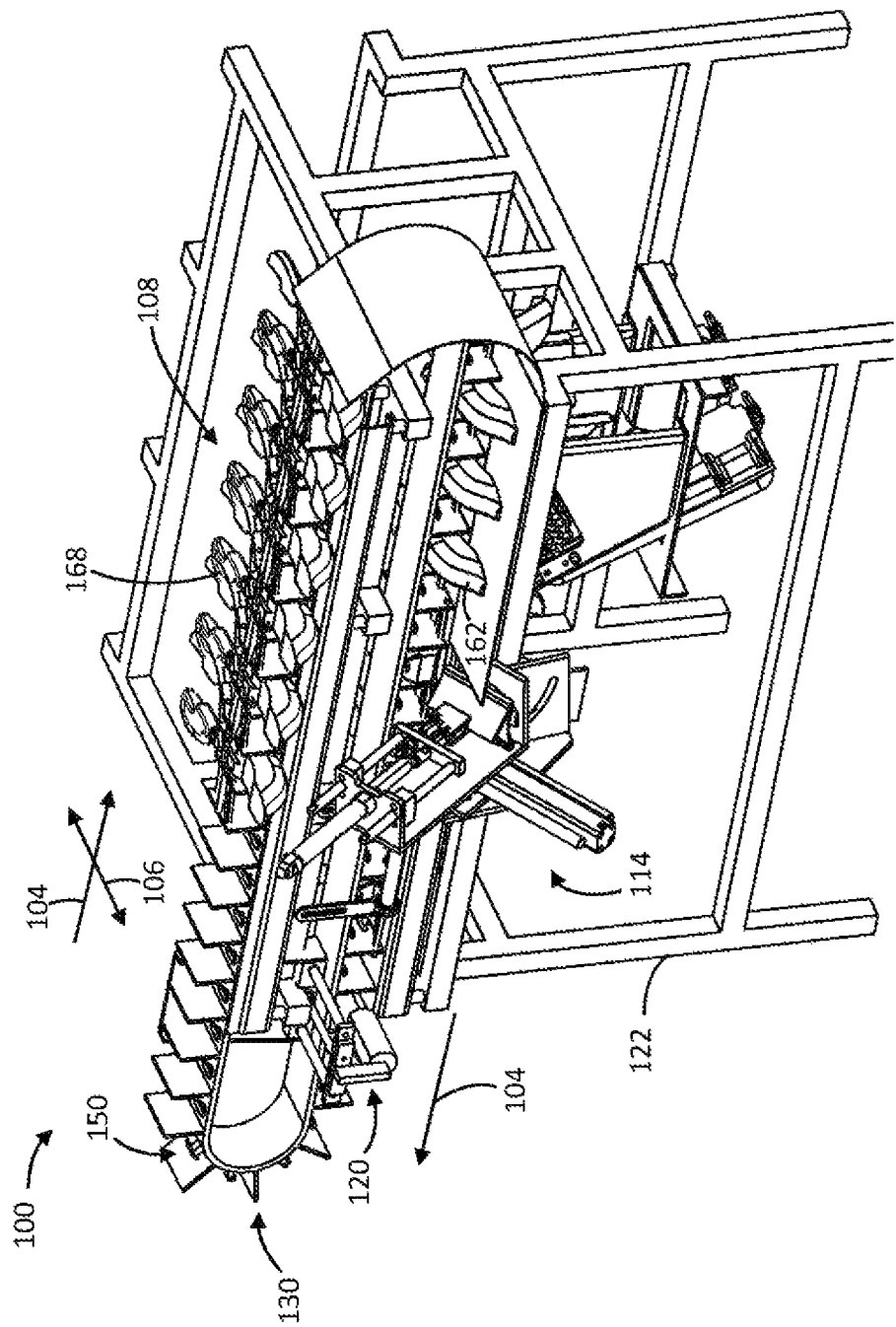
Figure 1B:
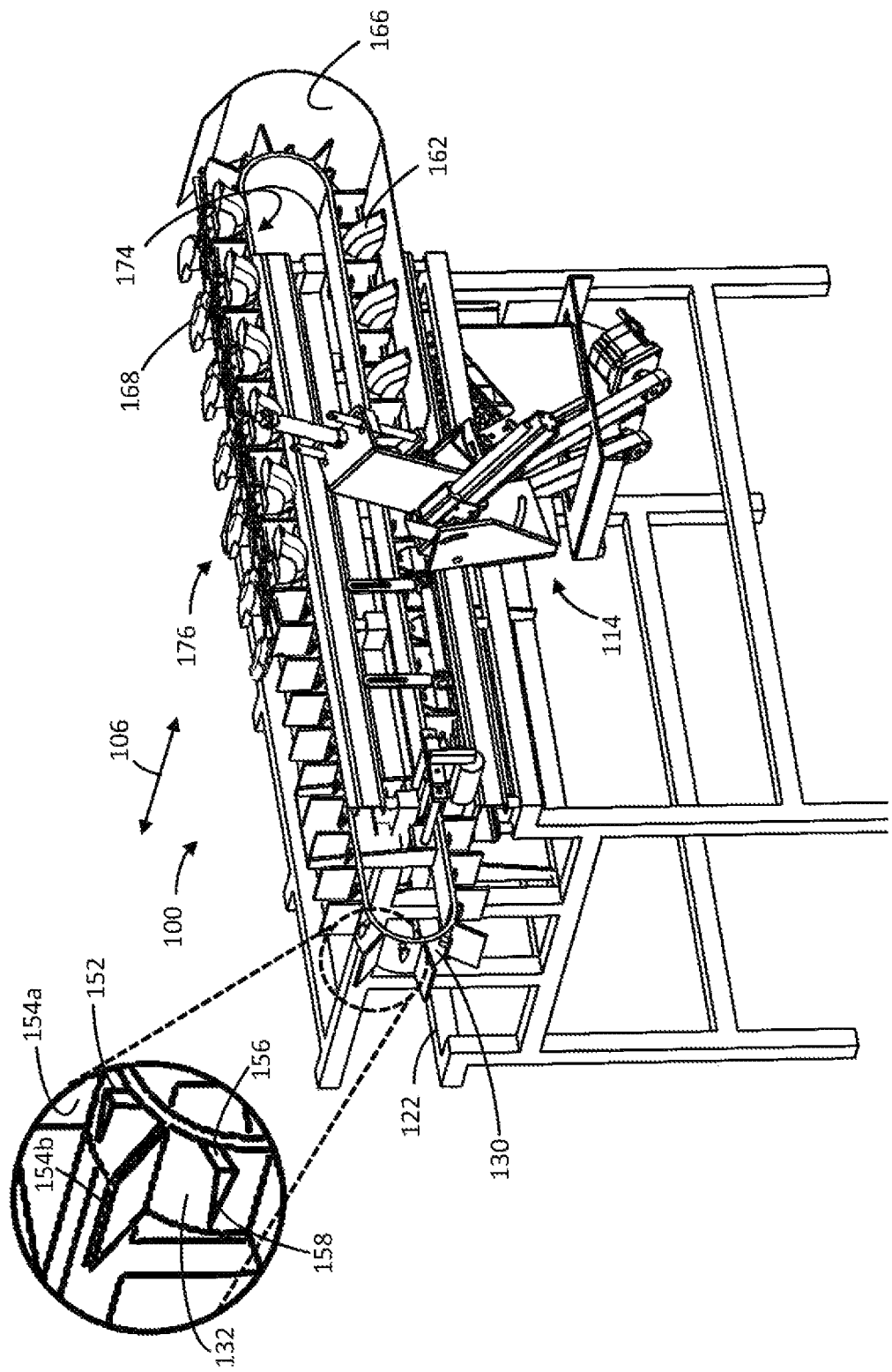
Figure 1C:
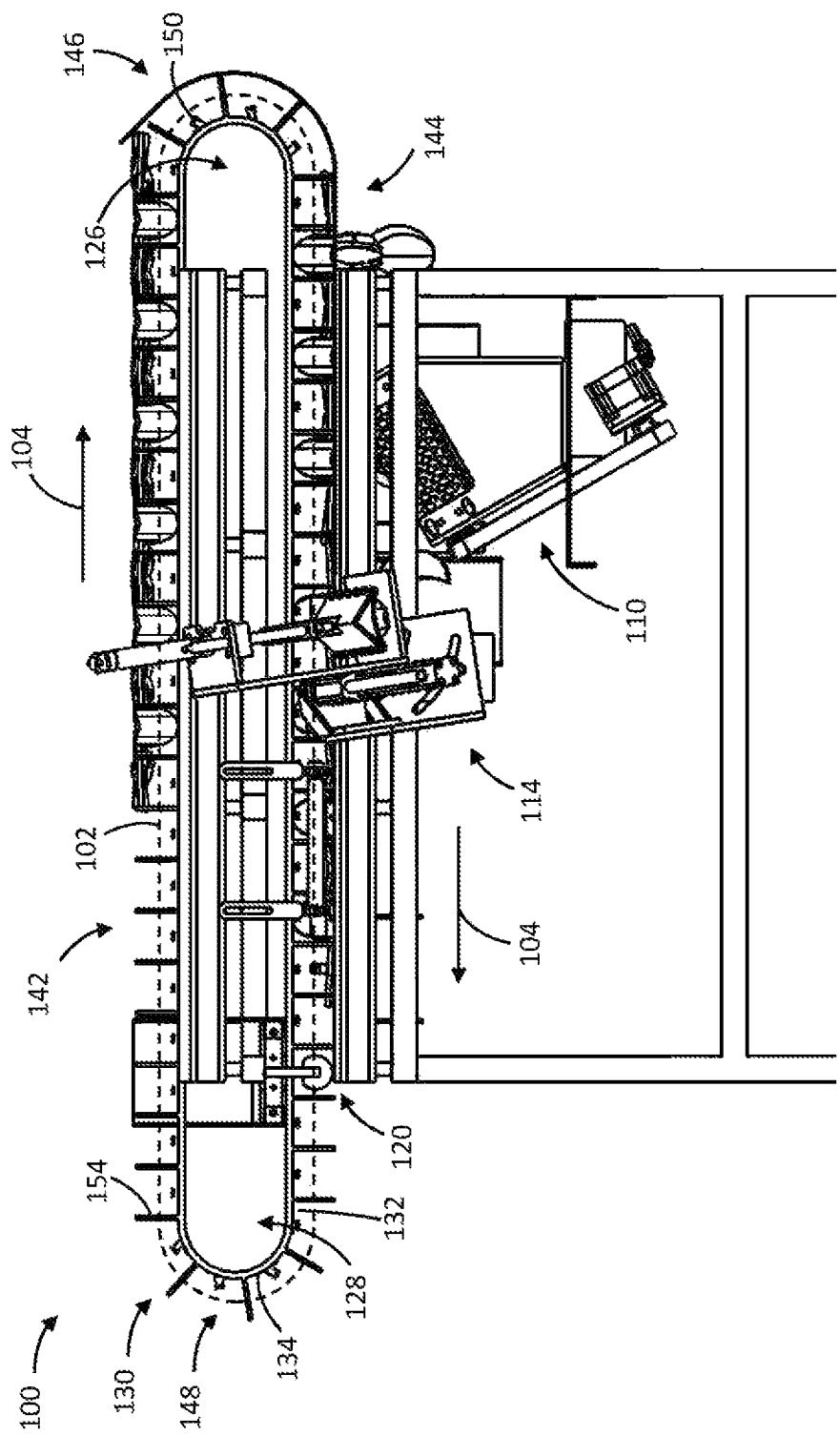
Figure 3B:
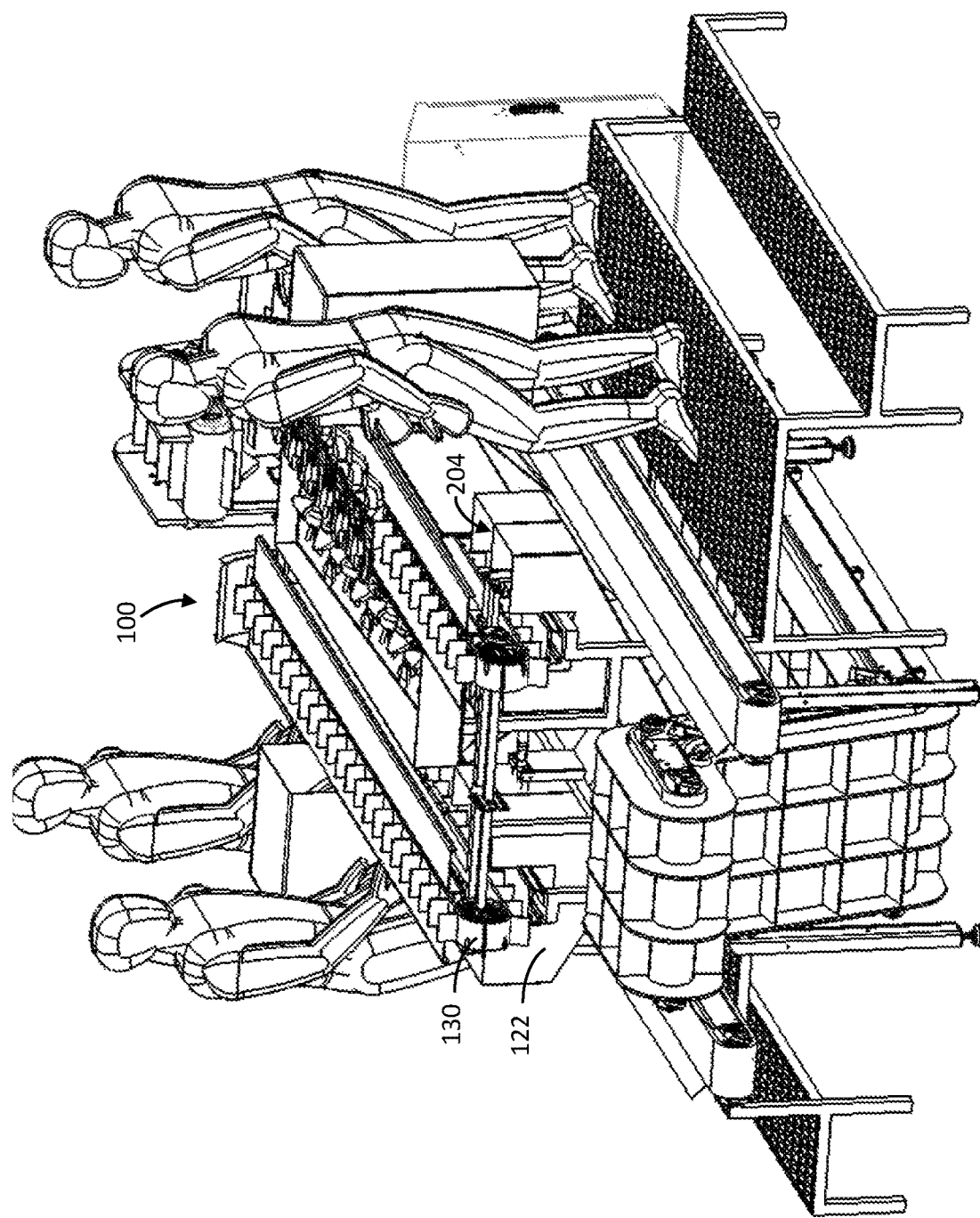
FIG. 3B is a rear perspective view of the crustacean butchering apparatus of FIG. 3A.
Figure 3C:
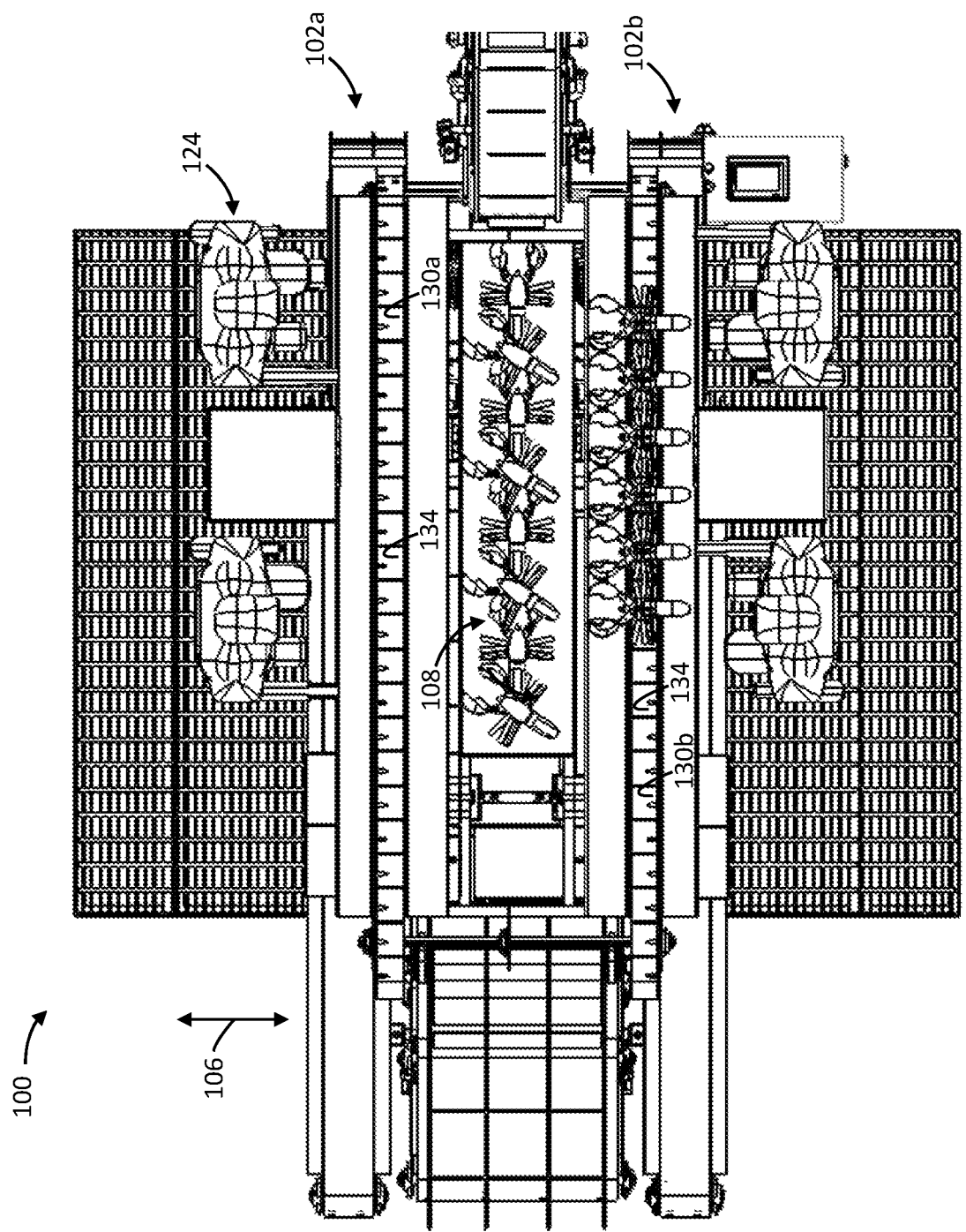
FIG. 3C is a top view of the crustacean butchering apparatus of FIG. 3A.

Referring now to FIGS. 1A to 1C, in the example illustrated, the crustacean butchering apparatus 100 includes a conveyor 130 for carrying the crustaceans to be butchered in a machine direction 104 along the processing path 102. In the example illustrated in FIG. 1A, the crustacean butchering apparatus 100 includes a single conveyor 130. In alternative embodiments, the crustacean butchering apparatus 100 may include multiple conveyors 130 forming a single processing path or may include multiple conveyors 130 forming multiple processing paths (e.g., conveyor 130a and 130b with respective processing paths 102a 102b, as shown in FIG. 3C).

The conveyor 130 may have any design suitable for transporting a crustacean along the processing path 102. For example, the conveyor 130 may be an indexing conveyor or a continuous flow conveyor. Further, the conveyor 130 may be oriented in any direction suitable for transporting a crustacean along the processing path 102. That is, the conveyor 130 may have a crustacean carrying surface 132 that is generally parallel to a ground surface, as is illustrated in FIG. 1C. Alternatively, the conveyor 130 may have a crustacean carrying surface 132 that is generally perpendicular or at an angle to the ground surface.

In the example illustrated in FIG. 1C, the conveyor 130 is a conveyor belt 134. When configured as a conveyor belt 134, the conveyor may extend about any number of pullies 136 (see FIG. 3E). In the example illustrated, the conveyor belt 134 extends about a drive pully 138 and a tail pully 140.

Figure 10A:
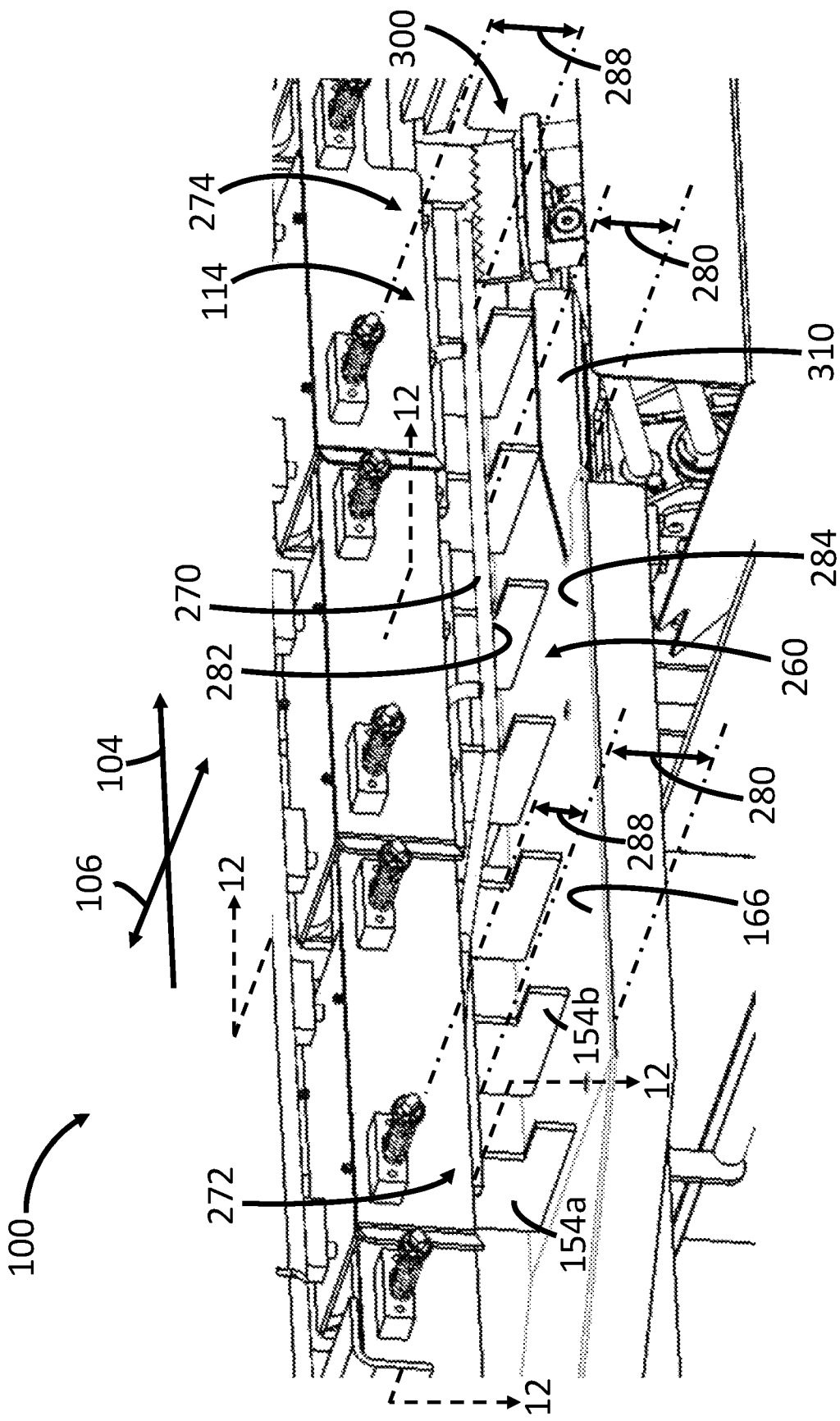
FIG. 10A is a front perspective view of an alternative embodiment of a tail removing tool.
Figure 10B:
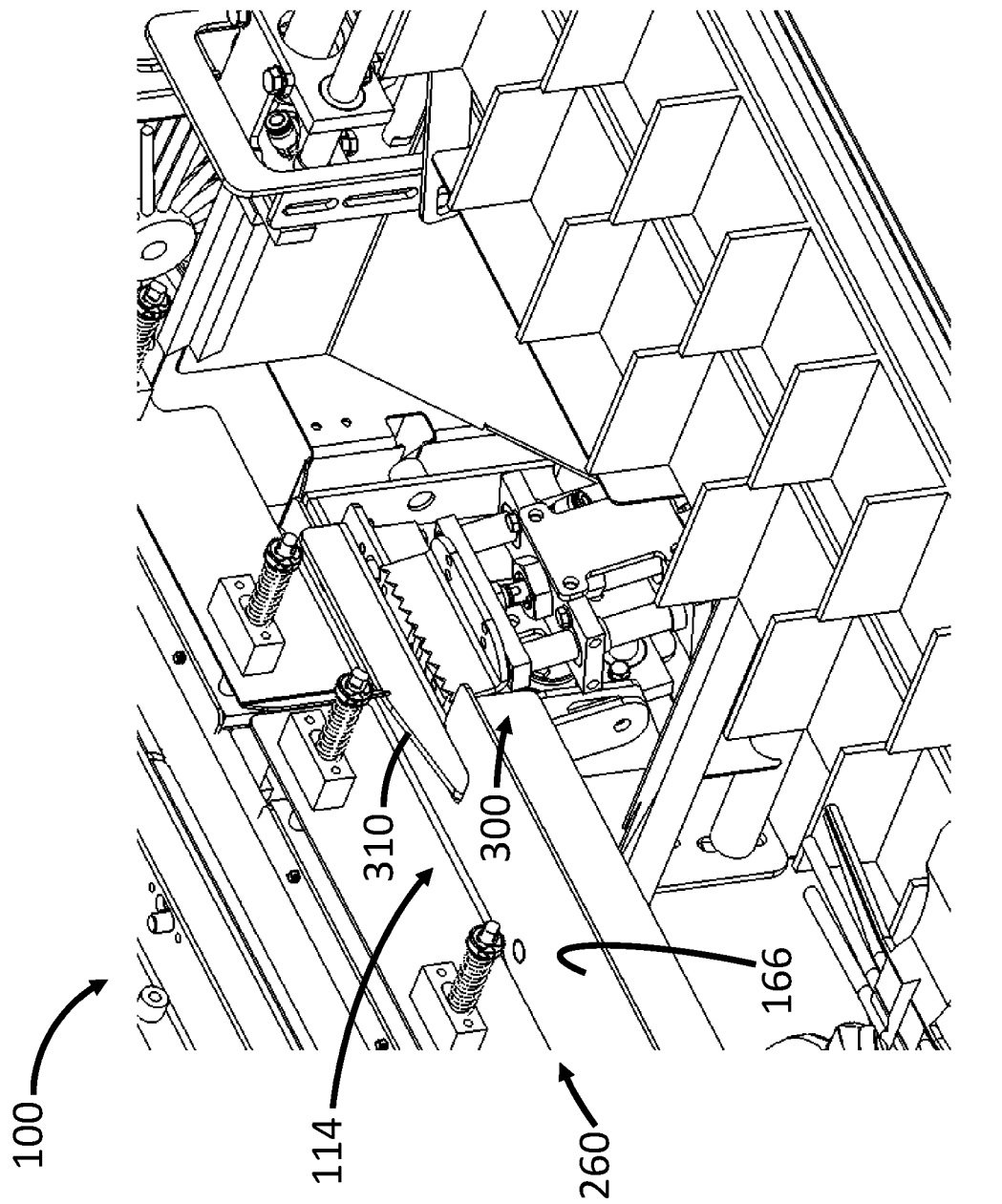
FIG. 10B is a front perspective view of the tail removing tool of FIG. 10A, shown with a ripper of the tail removing tool in a starting position.
Figure 10C:
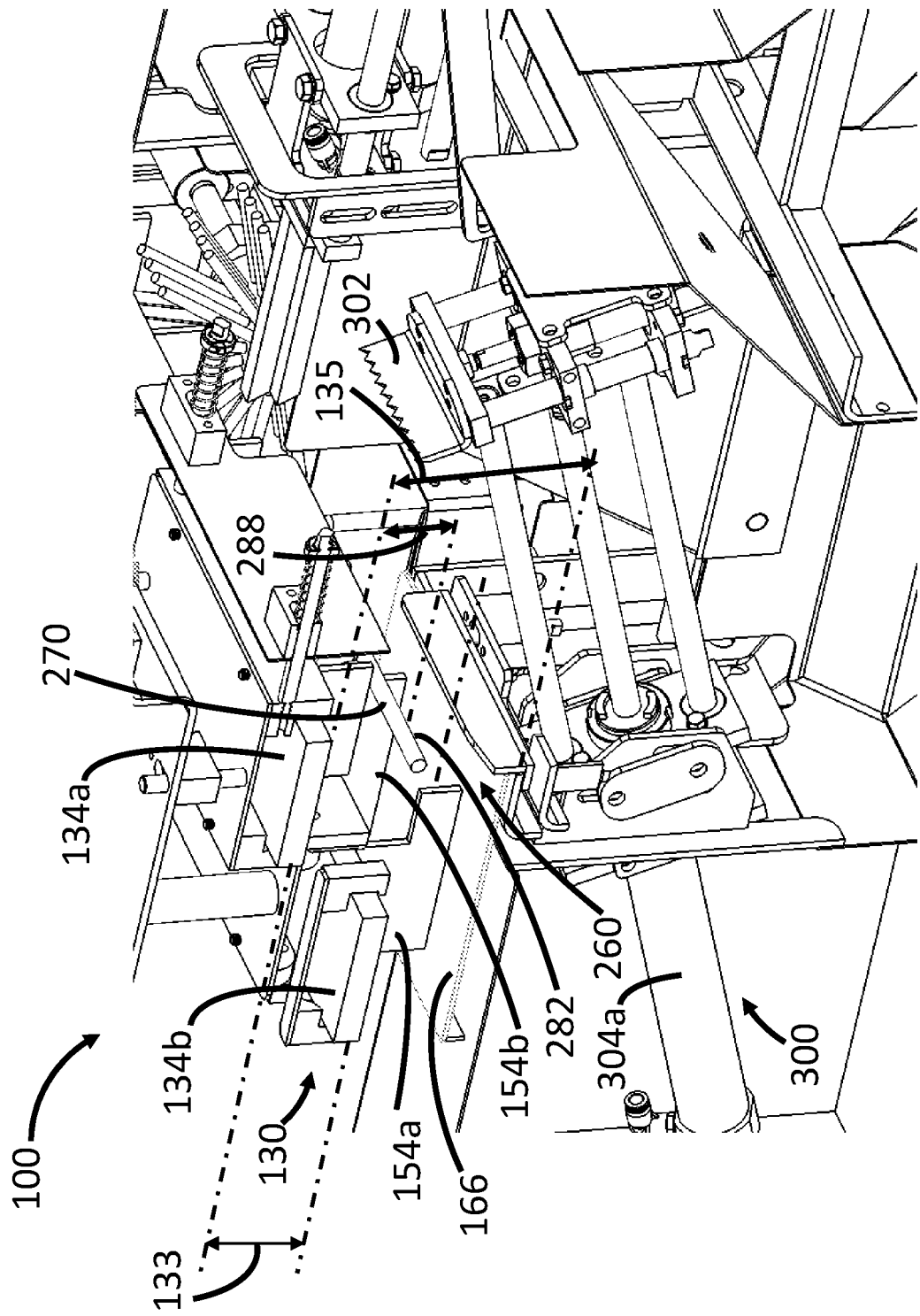
FIG. 10C is a front perspective view of the tail removing tool of FIG. 10A shown with the ripper of the tail removing tool is a ripping complete position.

Optionally, as shown in FIG. 10C, the conveyor 130 may include a first belt 134a and a second belt 134b that each extend along the processing path 102 (or at least a portion of the processing path 102). As shown in FIG. 10C, the first belt 134a may diverge from the second belt 134b along at least a portion of the processing path 102. It may be desirable to separate the first belt 134a from the second belt 134b to alter the relative position of a first portion of a crustacean relative to a second portion of the crustacean. In the example shown in FIG. 10C, the first belt 134a of the conveyor 130 is vertically displaced (e.g. displaced in a direction transverse to both the machine and cross-machine directions) a distance 133 from the second belt 134b of the conveyor 130 to vertically space a head end of a crustacean secured to the first belt 134a from a tail end of the crustacean.

Referring back to FIG. 1C, in the example illustrated, the conveyor belt 134 has upper belt section 142 extending between the drive pully end 126 and the tail pully end 128 and a lower belt section 144 extending between the drive pully end 126 and the tail pully end 128. Tools may be provided along one of the upper belt section 142 or the lower belt section 144, along both of the upper belt section 142 and the lower belt section 144, and/or along transition sections 146, 148 between the upper and lower belt sections 142, 144.

In the example illustrated in FIC. 1C, the tools are provided along the lower belt section 144 and the crustaceans to be butchered are loaded onto the crustacean butchering apparatus 100 along the upper belt section 142.

In some examples, the conveyor 130 may include a plurality of carapace grips 150 for securing the crustaceans thereto. Carapace grip 150 may have any design suitable for securing a crustacean to the conveyor 130. For example, any one of a barrier, a brace, a strap, a clamp, vacuum suction, a spike, etc. may be used to secure a crustacean of the plurality of crustaceans to the conveyor 130. It will be appreciated that a single carapace grip 150 may secure multiple crustaceans to the conveyor 130. Further, it will be appreciated that a carapace grip 150 may comprise multiple individual griping components that cooperate to secure a crustacean to the conveyor 130 (e.g., a carapace grip 150 may comprise a spike and a strap).

Optionally, as shown in FIG. 1C, the carapace grips 150 may be equally spaced apart from each other along the conveyor 130 in the machine direction 104.

It may be desirable to secure the crustaceans to the conveyor 130 at a predetermined position as the tools used to butcher the crustaceans may require precise alignment with the crustaceans. Further, the carapace grips 150 may hold the crustaceans stationary relative to the conveyor 130 while the tools apply forces on the crustaceans in the machine direction 104 and/or the cross-machine direction 106 during the butchering process.

In the example illustrated in FIG. 1B, each carapace grip 150 is configured to secure a single crustacean to the conveyor 130 and includes a spike 152 and two barriers 154a, 154b that extend outwardly from the conveyor belt 134. In the example illustrated, the spike 152 secures the crustacean to the conveyor 130 and the barriers 154a, 154b help keep the crustaceans aligned in the cross-machine direction 106 (i.e., the barriers 154a, 154b may limit the amount the crustaceans may twist relative to the spike 152 during butchering). While not shown, a strap (e.g., an elastic strap) may extend between adjacent barriers 154a, 154b across the crustaceans to further secure the crustaceans to the conveyor 130 during the butchering process. In the example shown in FIG. 10C, the grip 150 (not shown) is secured to the first belt 134a and the barriers 154a, 154b extend outwardly from the second belt 134b. As shown in FIG. 10C, due to the spacing distance 133 between the first belt 134a and the second belt 134b, the barriers 154a, 154b may extend to a tail support surface 166 while having a height that is less than a distance 135 between the first belt 134a and the support surface 166. Accordingly, relatively shorter barriers 154a, 154b may be used to help keep the crustaceans aligned in the cross-machine direction 106.

The spike 152 may be of any shape and size and may pierce any portion of the crustacean to secure the crustacean to the conveyor 130. As shown in FIG. 1B, the spikes 152 may have a proximal end 156 connected to the conveyor 130 and a distal end 158 which may pierce a portion of the crustacean to secure the crustacean to the conveyor 130. In the example illustrated in FIG. 1B, the distal end 158 of the spikes 152 extend in the cross-machine direction 106.

In the example illustrated, the spike 152 is configured to pierce the crustacean between the carapace 160 and tail 162, with the distal end 158 of the spike 152 extending away from the tail 162 into the carapace 160. More specifically, as shown in FIG. 1A, the spikes 152 in the example illustrated are configured to pierce the upper side of the crustacean between the tail 162 and the carapace 160 (i.e., the crustacean may be loaded with their underside facing upwardly). It has been determined that by piercing the crustacean between the tail 162 and the carapace 160, the spike 152 may puncture a membrane material (not shown) that extends between the tail 162 and the body 164 within the carapace 160, which may aid in the separation of the tail 162 from the carapace 160 (described in more detail below).

In the example illustrated in FIGS. 1A-1C, the crustaceans are loaded along the upper belt section 142 with their underside facing upwardly and are butchered (i.e., engaged by the tools) along the lower belt section 144 with their underside facing downwardly. It may be desirable to butcher the crustaceans with their underside facing downwardly as this orientation may allow for the claws 168 and tail 162 of the crustacean to hang away from the carapace 160 due to gravity. When the claws 168 and tail 162 of the crustacean are hanging, the tools may engage the claws 168 and tail 162 and not be interfered with by the carapace 160. Further, by loading the crustaceans along the upper belt section 142 and butchering the crustaceans along the lower belt section 144, as opposed to loading and butchering the crustaceans along only one of the upper and lower belt sections 142, 144, the overall footprint of the crustacean butchering apparatus 100 may be reduced.

It will be appreciated that the configuration of the carapace grip 150 may be dependent on the type of crustacean to be butchered. Accordingly, in some examples, the carapace grips 150 may be removable from the conveyor 130 so that they may be exchanged for a carapace grip 150 of a different configuration. Carapace grips 150 that are removeable may also be desirable as they may allow for an operator to readily replace a carapace grip 150 in the event it becomes damaged. In alternative embodiments, carapace grips 150 may be non-removable.

Additional restraints may be positioned along the processing path 102 to help keep the crustaceans secured to the conveyor 130 and/or in place relative to the conveyor 130 during the butchering process. For example, as shown in FIG. 1B, a tail support surface 166 may be provided along at least a portion of the processing path 102 to support the tail 162 of the crustation. The tail 162 of the crustacean may have considerable weight, and if not supported, under the force of gravity, it may pull the carapace 160 from the carapace grip 150. In alternative embodiments, there may not be a tail support surface 166.

Figure 2:
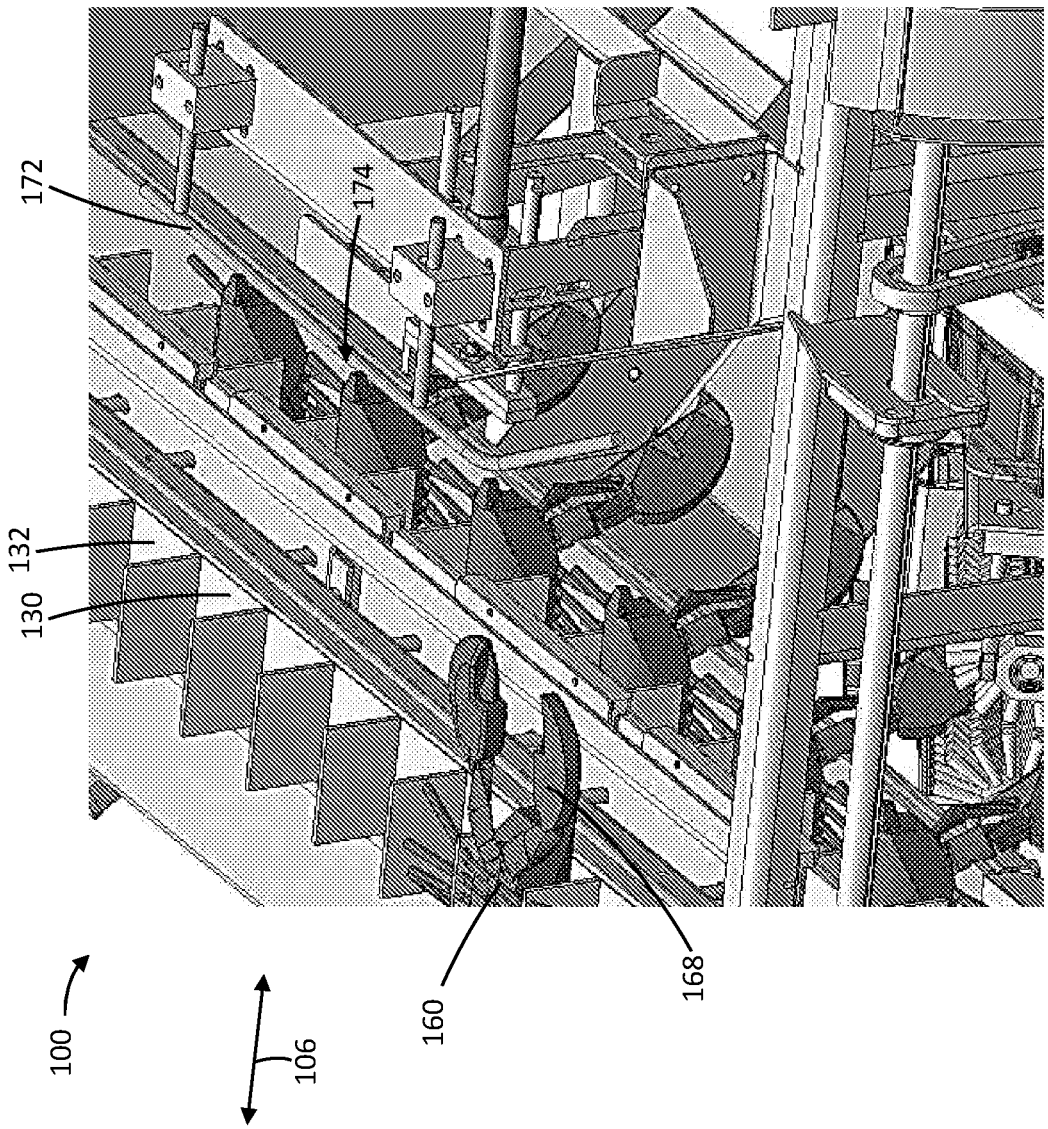
FIG. 2 is a perspective view of an alternative embodiment of a crustacean butchering apparatus having a guide rail.

Referring now to FIG. 2, as a second example of a restraint, a guide rail 172 may be provided along at least a portion of the processing path 102 to further hold the crustaceans in place relative the conveyor 130. In the example shown in FIG. 2, the guide rail 172 reduces the likeliness of the crustacean moving in the cross-machine direction 106. In alternative embodiments, there may not be a guide rail 172.

In the example illustrated in FIG. 2, the crustaceans are secured to the conveyor 130 by a spike 152 as illustrated in FIG. 1B, extending within the carapace 160 from a tail end 174 toward the head end 176. Accordingly, in the example illustrated, the guide rail 172 and the distal end 158 of the spike 152 act as barriers to movement of the crustacean in the cross-machine direction 106. Optionally, the guide rail 172 may be biased (e.g., by a spring) toward the conveyor 130 to provide a force against the crustacean in the cross-machine direction 106. In some examples, the guide rail 172 may be positioned along the processing path 102 in parallel with the claw removing tool 112 and the tail removing tool 114.

Claw Elastic Stripping Tool

Figure 3D:
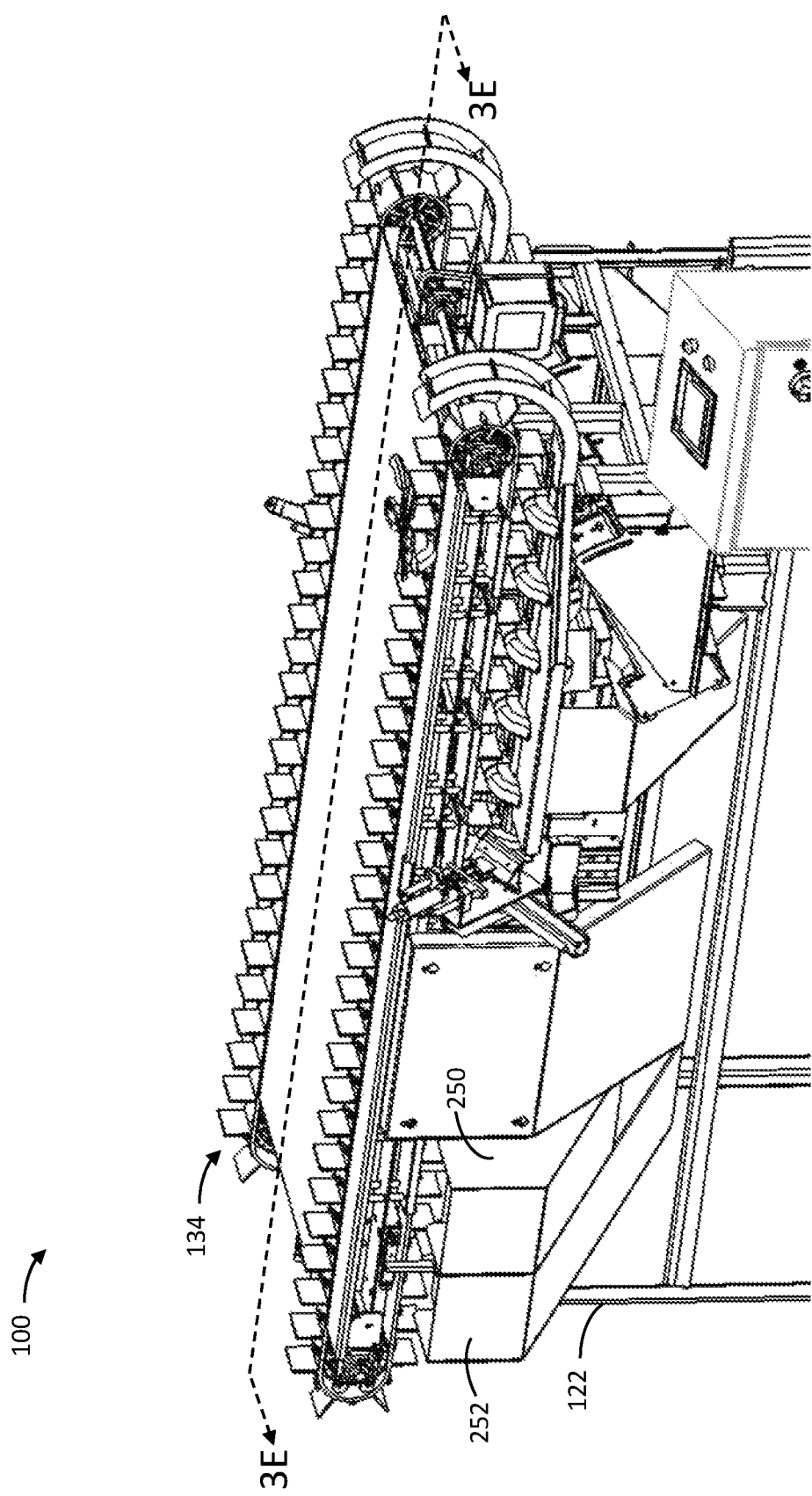
FIG. 3D is a front perspective view of the crustacean butchering apparatus of FIG. 3A, shown without operators, an operator platform, a conveyor for delivering crustaceans, and a conveyor for removing the butchered crustacean parts.
Figure 3E:
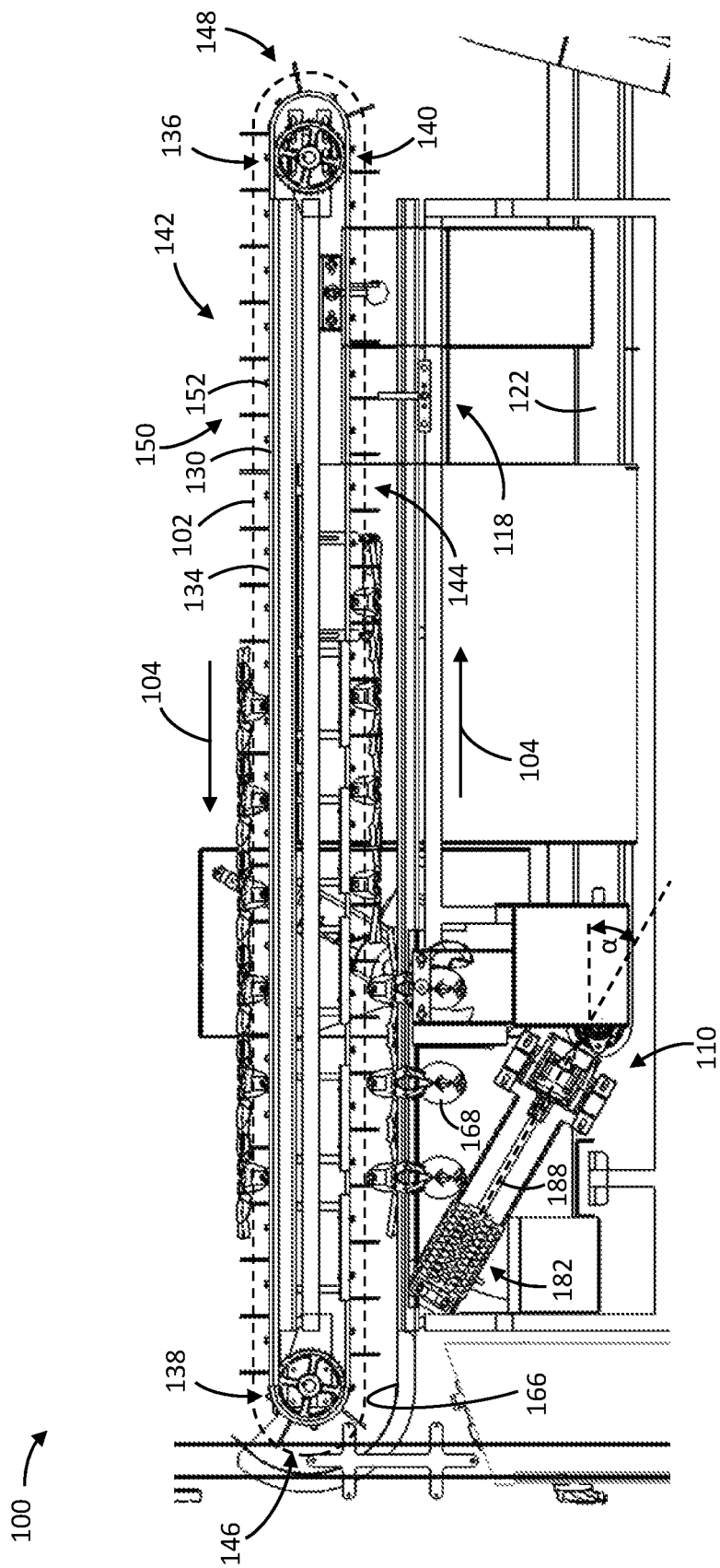
FIG. 3E is a cross-sectional view of the crustacean butchering apparatus of FIG. 3D, taken along line 3E-3E.
Figure 4A:
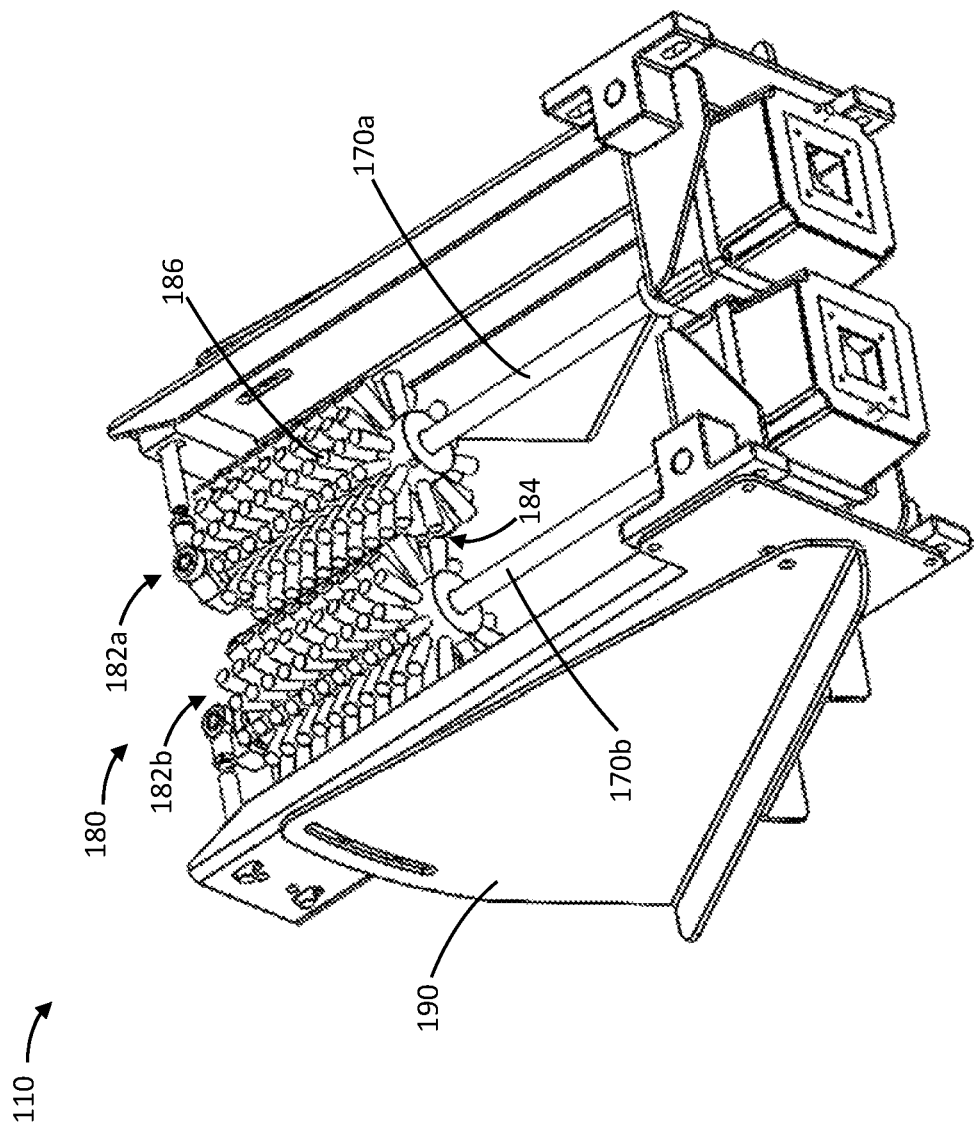
FIG. 4A is a rear perspective view of a claw elastic stripping tool of the crustacean butchering apparatus of FIG. 3A, shown in isolation.

With reference to FIGS. 3E and 4A to 4C, the crustacean butchering apparatus 100 may include a claw elastic stripping tool 110. The claw elastic stripping tool 110 may have any design suitable for removing an elastic from a claw of a crustacean. An example of a claw elastic stripping tool 110 is shown in FIG. 4A. While the drawings illustrate a claw elastic stripping tool 110 for stripping elastics from both claws 168 of a crustacean, it is to be understood that the crustacean butchering apparatus 100 may include two claw elastic stripping tools 110, each for stripping an elastic from a respective claw 168 of a crustacean.

It may be desirable to strip elastics from the claws 168 during the butchering process because it has been found that claw elastics may be stripped from respective claws 168 more consistently when the claws 168 are still attached to the carapace 160. Accordingly, when the crustacean butchering apparatus 100 includes a claw elastic stripping tool 110 and a claw removing tool 114, the claw elastic stripping tool 110 is generally positioned upstream of the claw removing tool 114. In alternative embodiment, claw elastic stripping tool 110 may be positioned downstream of claw removing tool 114.

Claw elastics may be stripped from their respective claws 168 by (a) severing the elastic; or (b) pulling/rolling (i.e., sliding) the elastic off a distal end 178 of the claws 168. To sever an elastic, a cutter (e.g., a blade, laser, heat, etc.) may be used. To slide an elastic band off a distal end 178 of a claw 168, the claw elastic stripping tool 110 may comprise an elastic engagement member 180 for urging (i.e., pushing and/or pulling) the elastic band off the claw 168.

The elastic engagement member 180 may have any design suitable for engaging an elastic to remove it from a respective claw. For example, the elastic engagement member 180 may be a hook (not shown). In another example, the elastic engagement member 180 may be a roller 182, or, as shown in FIG. 4A, a plurality of rollers 182a, 182b.

When configured as a roller 182, the elastic engagement member 180 may have a contact surface 184 which may be brought into engagement with claws 168 having elastics thereon. It will be appreciated that as the contact surface 184 of the roller 182 rotates towards the distal end 178 of the claw 168 at a contact point between the roller 182 and the claw 168 while in engagement with the claw 168 and elastic, force(s) (e.g., friction and/or applied) exerted by the roller 182 on the elastic may cause the elastic to slide off the distal end 178 of the claw 168.

The contact surface 184 of the roller 182 may be brought into engagement with the claw(s) 168 by any suitable means. In the example illustrated in FIG. 3E, the position of the rollers 182 relative to the conveyor 130 remains stationary and the conveyor 130 moves the crustaceans into engagement with the rollers 182. Alternatively, the rollers 182 may be repositionable with respect to the conveyor 130 and brought into engagement with the claw(s) 168 by an actuator which may control the position of the rollers 182.

In the example illustrated in FIG. 4A, the rollers 182a, 182b include a plurality of bristles 186 drivingly connected to a respective roller axle 170a 170b. In alternative embodiments, the rollers 182 may be configured as a drum drivingly connected to a respective roller axle 170, optionally with an abrasive outer surface for engaging the elastic.

As shown in the example illustrated in FIG. 4A, the claw elastic stripping tool 110 may comprise a first roller 182a and a second roller 182b. However, it is to be understood that in some examples, only a single roller 182 may be used. With reference to FIG. 4C, it will be appreciated that when the claw elastic stripping tool 110 includes first and second rollers 182a, 182b, the contact surface 184a of the first roller 182a may engage a first portion of the elastics on a first side of the claws 168 and the contact surface 184b of the second roller 182b may engage a second portion of the elastics on a second side of the claws 168. Accordingly, the first and second rollers 182a, 182b may cooperate to slide the elastics off the respective claws 168.

As shown in FIG. 3E, the rollers 182 may optionally have a roller axis of rotation 188 which may be angled away from the conveyor 130 in the machine direction 104 by a non-zero angle α. The angle α may be between 0° and 120°, such as 10°-110°, or 30°-90°. When angled away from the conveyor 130 as shown, the vertical distance between the contact surface 184 and the conveyor 130 varies along the axial length of the roller 182. Angling the rollers 182 away from the conveyor 130 may be desirable because crustaceans may vary in size and may have relatively small or relatively large claws 168. Further, the length of a crustacean's carpus (i.e., leg segment extending between the carapace 160 and claw 168) may vary. Accordingly, angling the rollers 182 away from the conveyor 130 in the machine direction 104 may allow for the rollers 182 to strip elastics from claws 168 of various sizes and claws 168 that are positioned at various distances from their respective carapaces 160. In alternative embodiments, rollers 182 may not be angled away from conveyor 130.

Figure 4B:
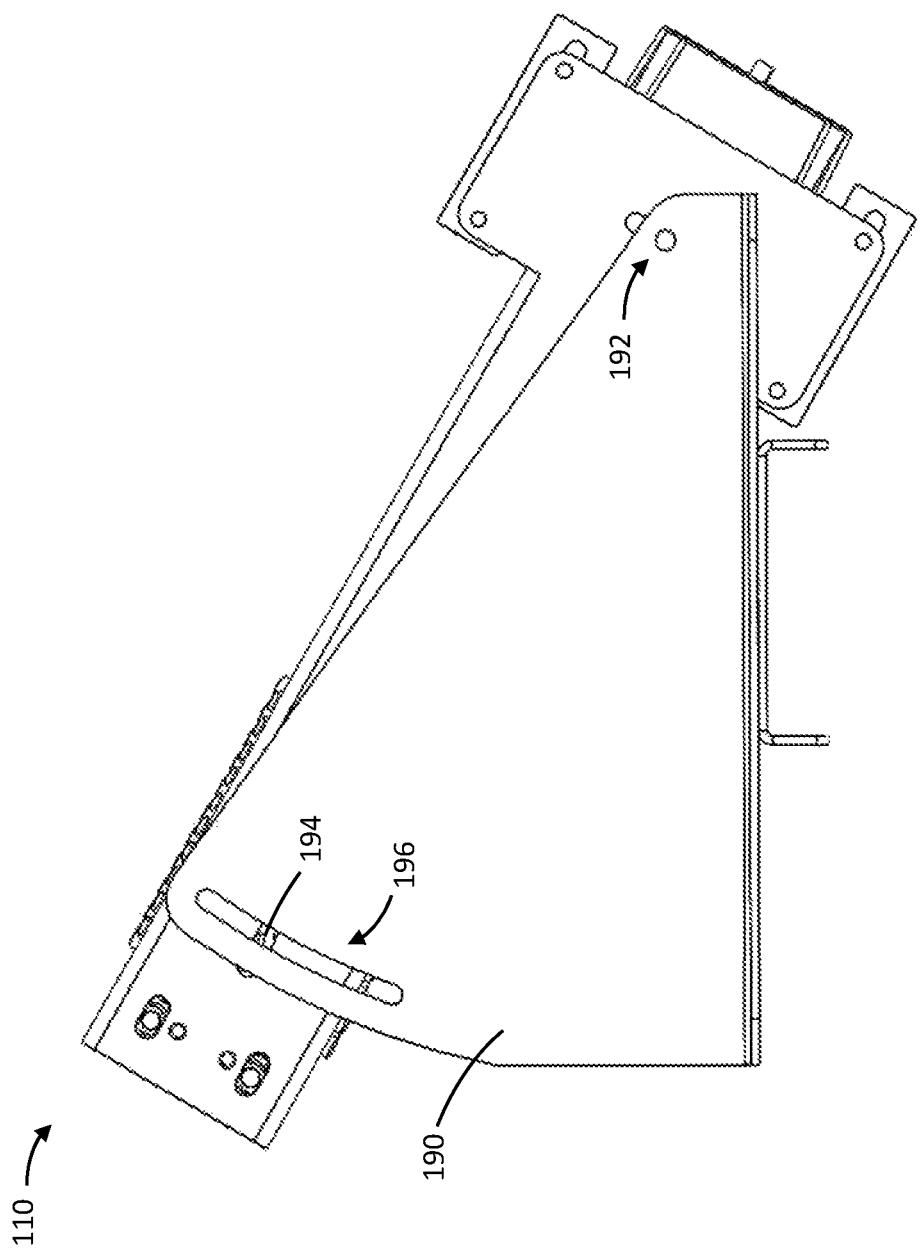
FIG. 4B is a side view of the claw elastic stripping tool of FIG. 4A.
Figure 4C:
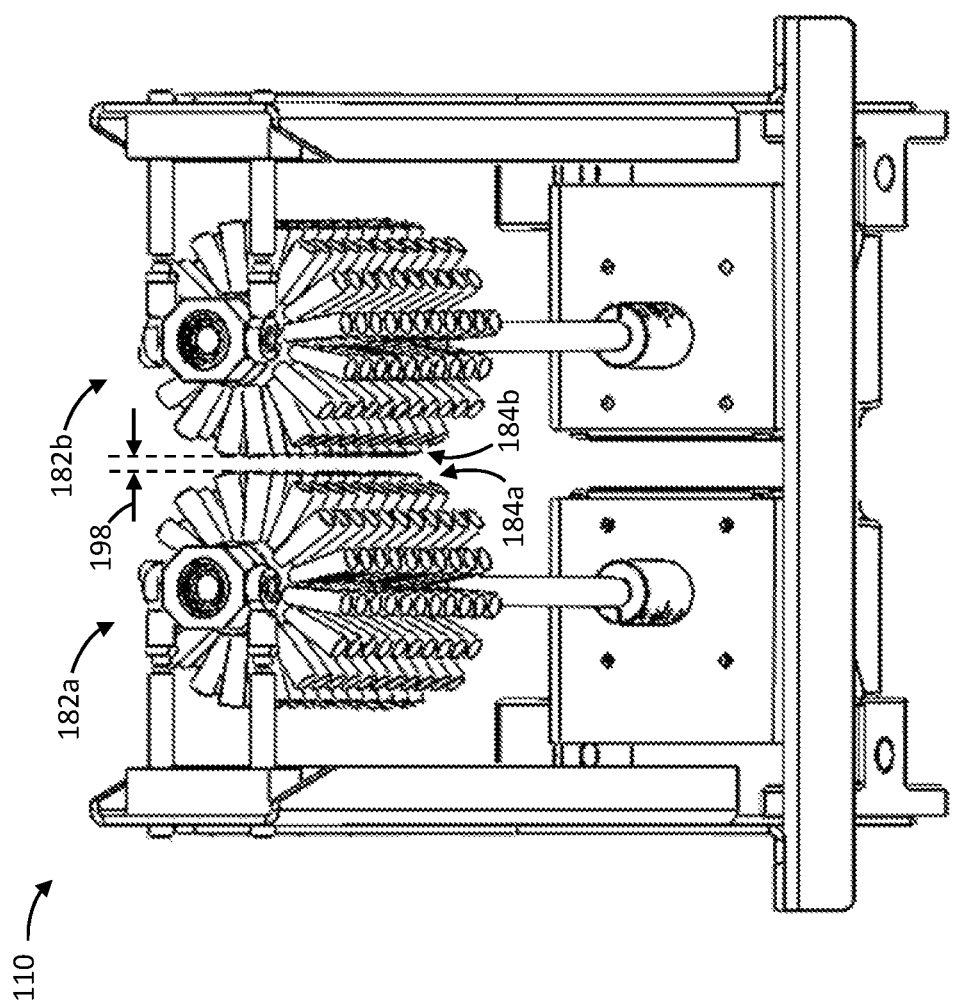
FIG. 4C is a front view of the claw elastic stripping tool of FIG. 4A.

With reference to FIG. 4B, the rollers 182 may be rotatably connected to the frame 122 of the crustacean butchering apparatus 100. Accordingly, the angle α of the roller axis of rotation 188 relative to the conveyor 130 may be adjustable. In the example illustrated, the claw elastic stripping tool 110 has a frame mount 190 which may be rigidly coupled to the frame 122 of the crustacean butchering apparatus 100 and the rollers 182 may be rotatably coupled to the frame mount 190. More specifically, the rollers 182 may be pivotally connected to the frame mount 190 at a first end thereof at a pivot joint 192 and may have a pin 194 which may slide in a corresponding slot 196 in the frame mount 190 at the second end thereof to limit the rotation of the rollers 182 relative to the frame mount 190. In alternative embodiments, the angle of the rollers 182 may not be adjustable relative to the frame mount 190. In alternative embodiments, the angle of the rollers 182 may not be adjustable relative to the frame 122 of the crustacean butchering apparatus.

Referring now to FIG. 4C, in the example illustrated, the rollers 182a, 182b are spaced apart by a separation distance 198. Optionally, the rollers 182 may be moveably mounted such that the separation distance 198 may be varied depending on the type of crustacean to be butchered. In some examples, the separation distance 198 may be zero or may be negative (e.g., the bristles 186 may overlap).

Claw Removing Tool

Figure 5A:
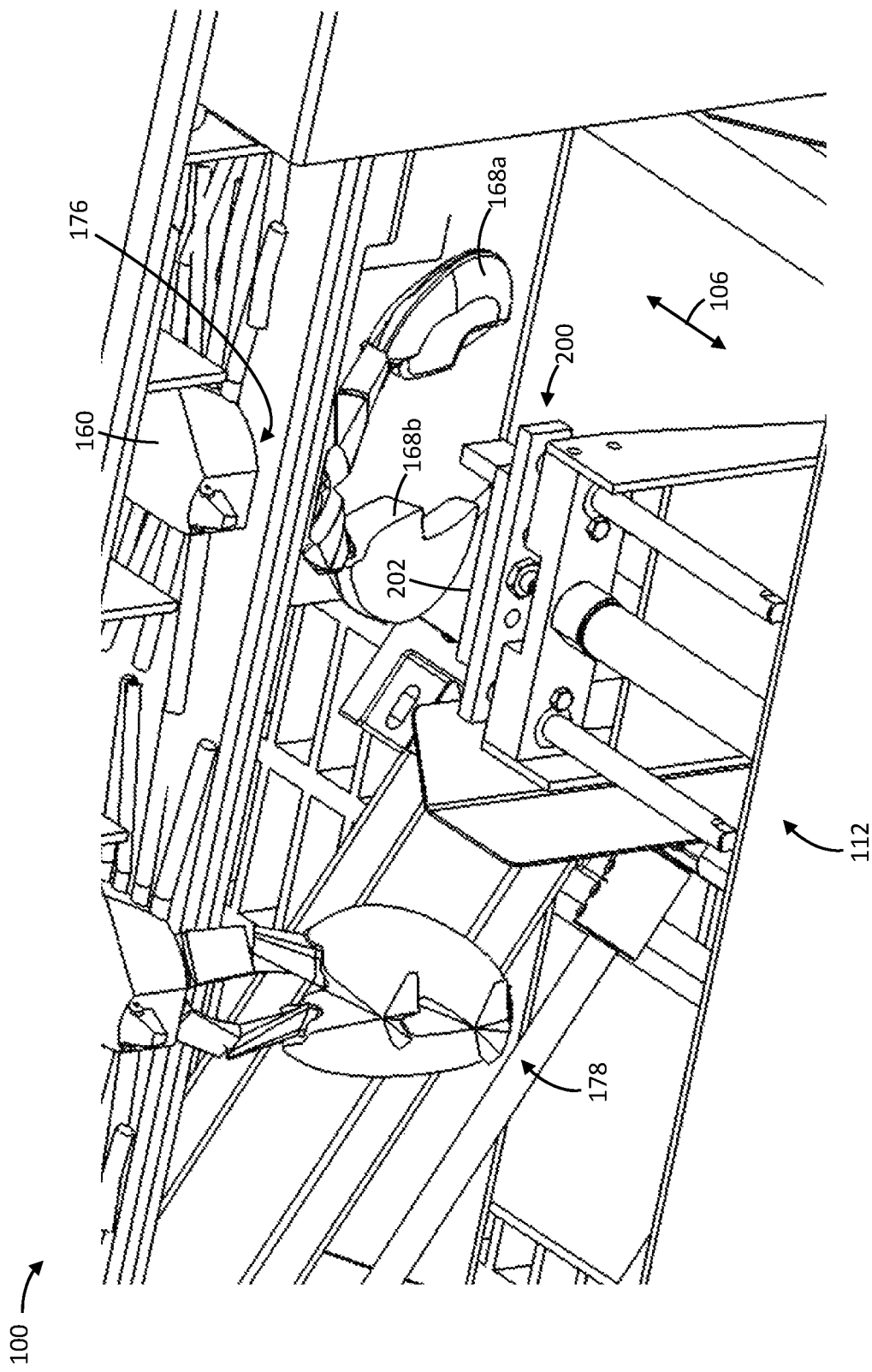
FIG. 5A is perspective view of a claw removing tool of the crustacean butchering apparatus of FIG. 3A.
Figure 5B:
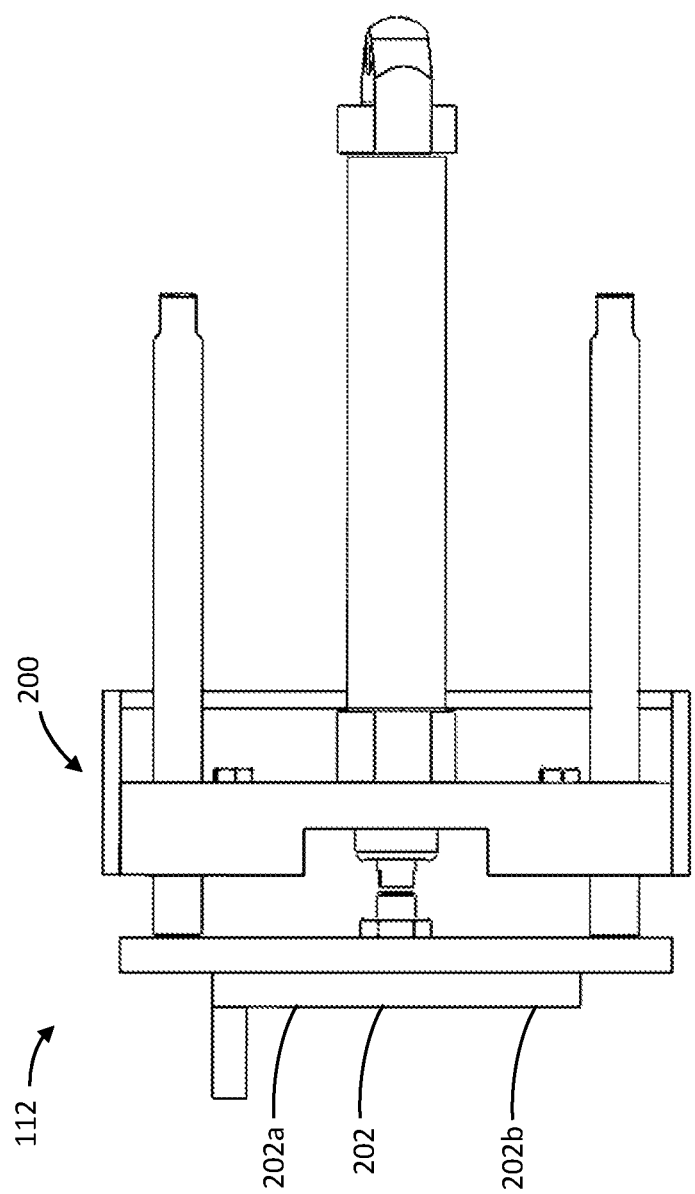
FIG. 5B is top view of the claw removing tool of FIG. 5A, shown in isolation.

With reference to FIGS. 5A and 5B, the crustacean butchering apparatus 100 may include a claw removing tool 112. Claw removing tool 112 may have any design suitable for separating at least one claw 168 from the carapace 160 of the crustacean. An example of a claw removing tool 112 in use on a crustacean butchering apparatus 100 is shown in FIG. 5A.

Referring now to FIG. 5B, which shows the claw removing tool 112 of FIG. 5A in isolation, the claw removing tool 112 may include a ram 200 that is moveable between a retracted position (as shown in FIG. 5B) and an extended position. As shown, the ram 200 may include a claw engagement surface 202. As the ram 200 is moved from the retracted position to the extended position, the claw engagement surface 202 may abut and push the claw 168 toward the carapace 160 of the crustacean. It will be appreciated that claws 168 (specifically the carpus) do not naturally bend in this axis and continuing to push the claw 168 toward the carapace 160 of the crustacean may cause the claw 168 to separate from the carapace 160.

In the example illustrated, the ram 200 has a first engagement surface 202a for pushing a first claw 168a of a crustacean toward the carapace 160 and a second engagement surface 202b for simultaneously pushing a second claw 168b of the crustacean toward the carapace 160. As shown, the first and second engagement surfaces 202a, 202b may be coterminous. However, it is to be understood that a crustacean butchering apparatus 100 may include multiple rams 200, each for engaging and pushing only a single claw 168 of a crustacean toward a carapace 160 thereof.

Optionally, the ram 200 may move from retracted position to the extended position in the cross-machine direction 106. In examples of the crustacean butchering apparatus 100 having a carapace grip 150 in the form of a spike 152, as illustrated in FIG. 1B, the ram 200 may move from the retracted position to the extended position in the cross-machine direction 106 toward the distal end 158 of the spike 152. That is, in the example illustrated in FIG. 1B, the distal end 158 of the spike 152 generally extends from right to left, and accordingly, the ram 200 may generally move from left to right when transitioning from the retracted position to the extended position. The ram 200 may move in the opposite direction of the extension of the spike 152 to reduce the likeliness of pushing the carapace 160 off the spike 152 during pushing of the claw 168. In alternative embodiments, the ram 200 may move in the same direction as the extension of the spike 152.

After being separated from the carapace 160, the claws 168 may fall into a claw collection chamber 204 (see, e.g., FIG. 3B) from which the claws 168 may be removed for further processing or packaging.

Claw Sorter

Figure 6A:
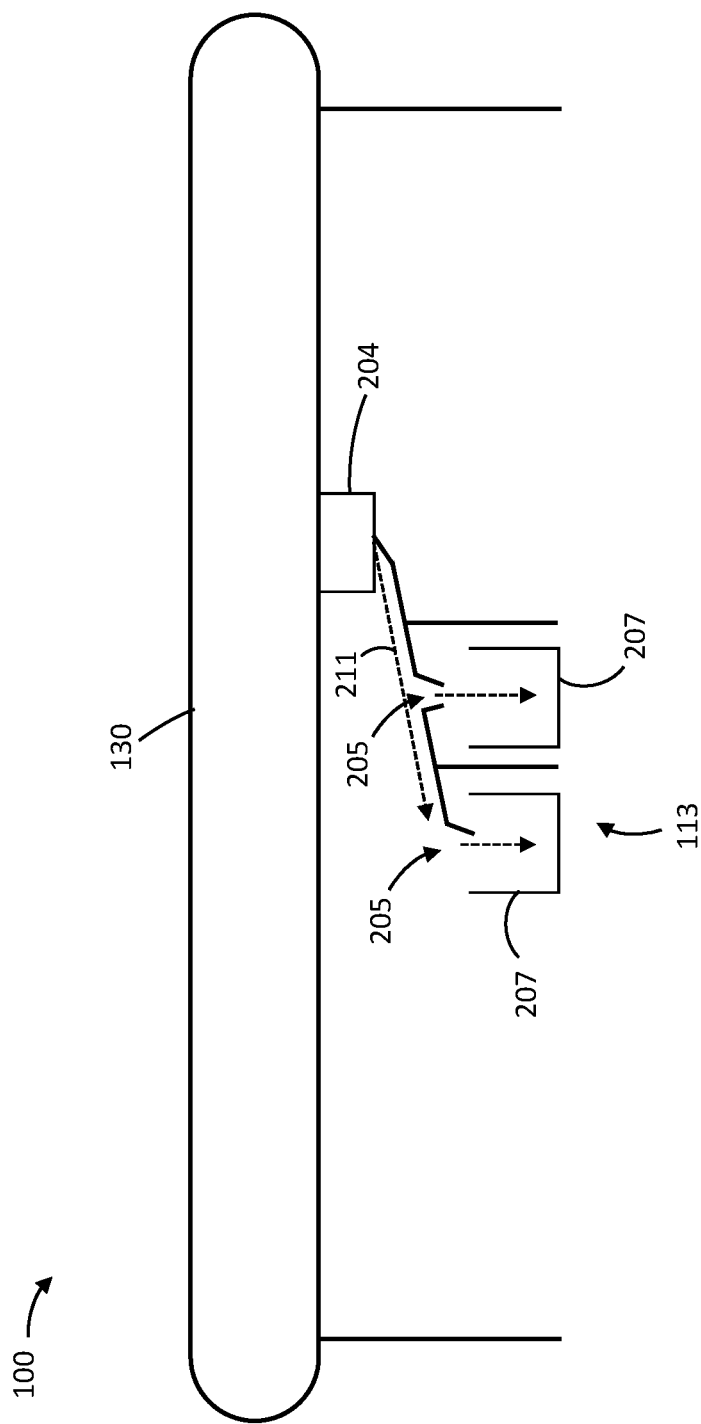
FIG. 6A is a schematic illustration of an alternative embodiment of a crustacean butchering apparatus including a claw sorter.
Figure 6B:
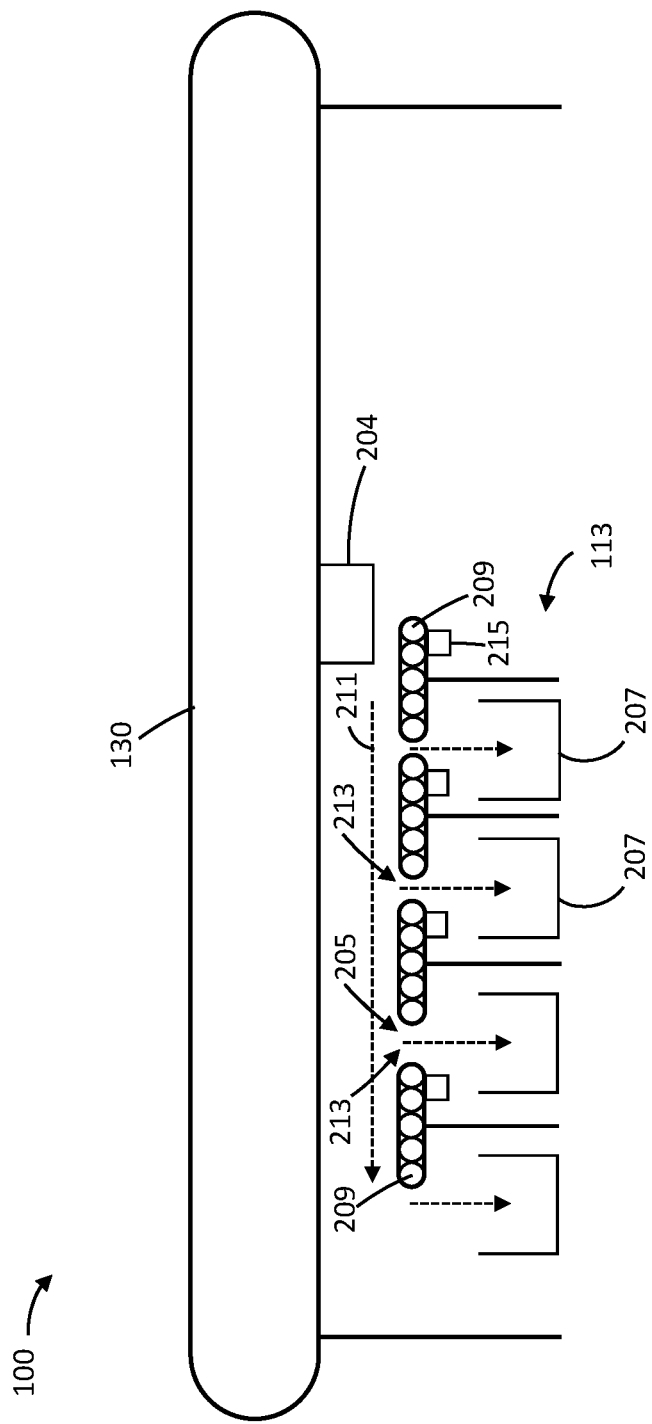
FIG. 6B is a schematic illustration of an alternative embodiment of a crustacean butchering apparatus including a claw sorter.
Figure 6C:
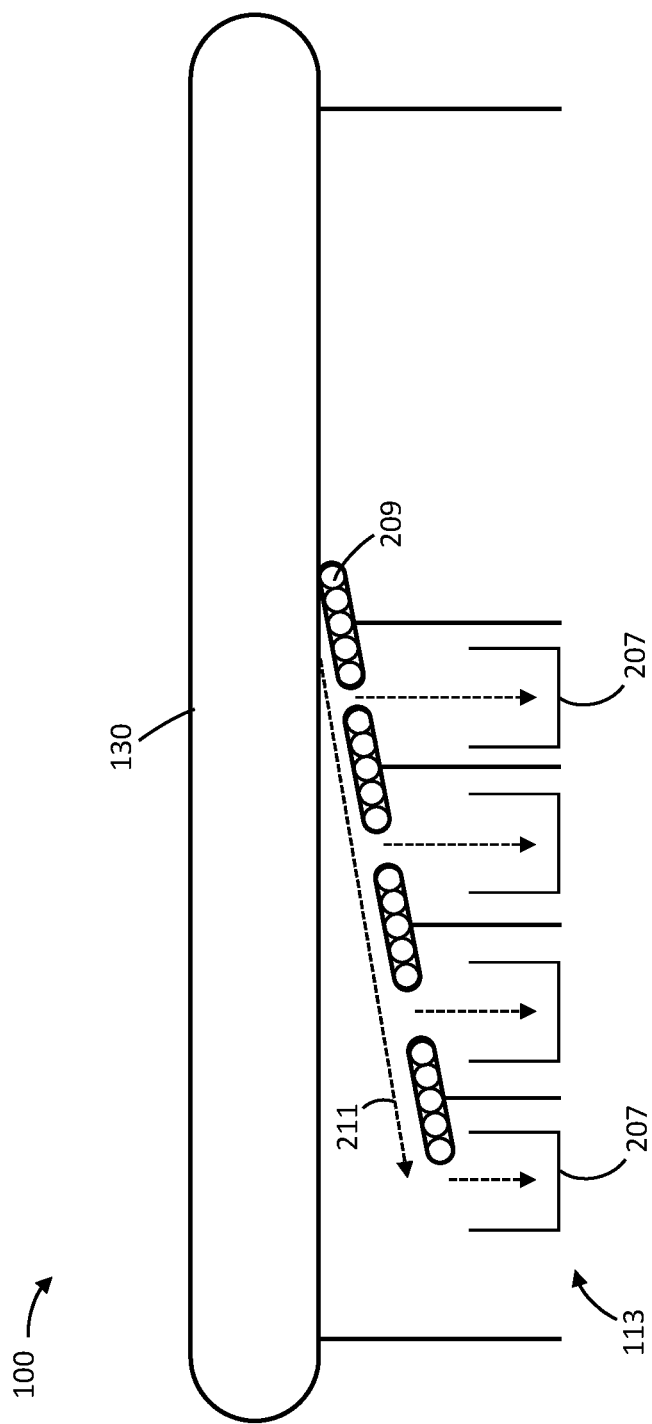
FIG. 6C is a schematic illustration of an alternative embodiment of a crustacean butchering apparatus including a claw sorter.

With reference to FIGS. 6A to 6C, the crustacean butchering apparatus 100 may include a claw sorter 113. Claw sorter 113 may have any design suitable for sorting crustacean claws 168 by size. It may be desirable to sort the claws 168 after they have been separated from the carapace 160 because the size of the claw 168 may determine its use. That is, larger claws 168 may be separated from smaller claws 168 and may be packaged and sold as a complete claw 168; whereas smaller claws 168 may be separated from the larger claws 168 and may be further processed to remove the meat therefrom prior to market.

As illustrated in FIG. 6A, the claw sorter 113 may receive claws 168 from the claw collection chamber 204. The claw sorter may then sequentially pass the claws 168 over a series of increasingly sized ports 205. If a claw 168 is small enough to pass through the port 205, it will, and can then be collected with similar sized claws 168 in a respective collection bin 207.

Optionally, as shown in FIG. 6B, the claw sorter 113 may include a plurality of rollers 209 aligned with their roller axes positioned parallel to one another. The claws 168 may travel along the rollers 209 from the claw collection chamber 204 along a sorting path 211. A gap 213 between adjacent rollers 209 may increase along the sorting path 211 forming the increasingly sized ports 205 through which the claws 168 may pass and therefore be sorted by size.

As shown in FIG. 6B, the rollers 209 may be driven by a motor 215 to urge the claws 168 along the sorting path 211 until they pass through an appropriately sized port 205. Alternatively, or in addition, as shown in FIG. 6C, the rollers 209 may be mounted relative to each other to provide a downwardly sloped sorting path 211 along which the claws 168 may travel by the force of gravity. As shown in FIG. 6C, the claw sorter 113 may receive the separated claws 168 directly as they are separated by the claw removing tool 112. That is, in the example illustrated in FIG. 6C, the first set of rollers 209 act as the claw collection chamber 204.

The claw sorter 213 may have any number of ports 205 and/or may have adjustable ports 205 so that the claws 168 may be sorted according to the processing facility's desires/needs. For example, a first processing facility may separate the claws 168 into groups of large and small (see e.g., FIG. 6A), whereas a second processing facility may sort the claws 168 into groups of extra-large, large, medium, and small (see, e.g., FIG. 6B).

Tail Removing Tool

Figure 7A:
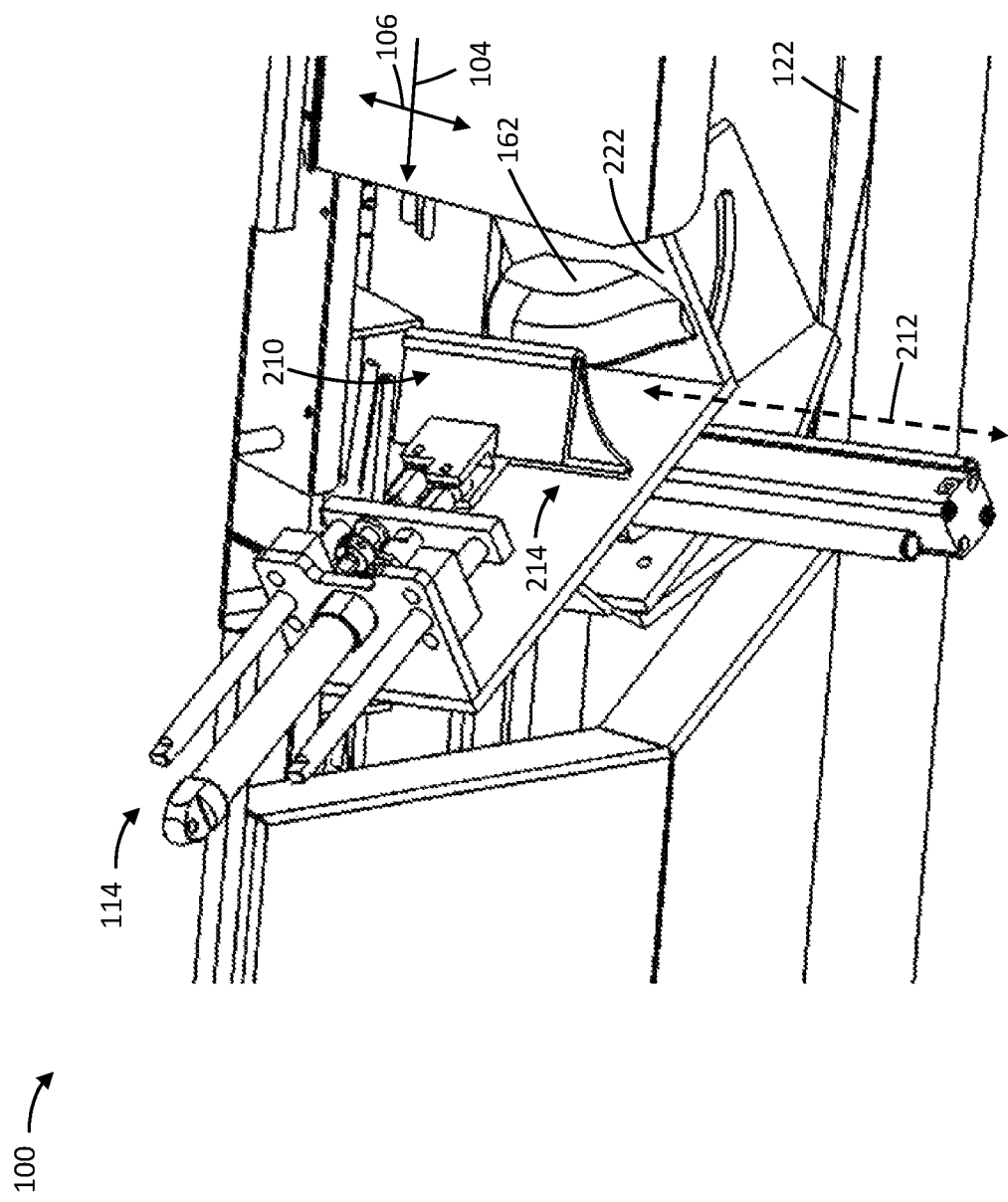
FIG. 7A is a perspective view of a tail removing tool of the crustacean butchering apparatus of FIG. 3A.

With reference to FIGS. 7A to 9, the crustacean butchering apparatus 100 may include a tail removing tool 114. The tail removing tool 114 may have any design suitable for separating a tail from a respective crustacean. An example of a tail removing tool 114 in use is shown in FIG. 7A.

As shown in FIG. 7A, the tail removing tool 114 may have a tail grip 210 for gripping the tail 162 of the crustacean and the tail grip 210 may be moveable along a pulling path 212 for pulling a gripped tail 162 away from a respective carapace 160 to separate the tail 162 from the carapace 160. The tail grip 210 may have any design suitable for gripping the tail 162 of a crustacean. For example, the tail grip 210 may be a spike, a vacuum, a clamp, etc.

Figure 7B:
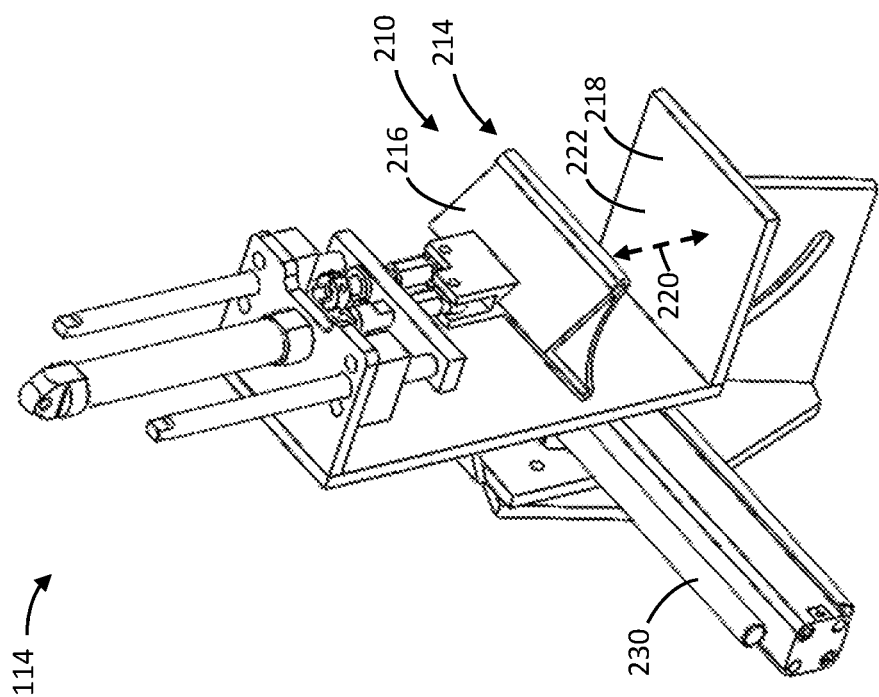
FIG. 7B is a rear perspective view of the tail removing tool of FIG. 7A, shown in isolation.

In the example illustrated in FIG. 7B, the tail grip 210 is a clamp 214. More specifically, the tail grip 210 is a clamp 214 having a first jaw 216 moveable along a clamping axis 220 toward a second jaw 218 for gripping the tail 162 of the crustacean therebetween.

Still referring to FIG. 7B, as shown, at least one of the first jaw 216 and second jaw 218 may have a clamping surface 222 to which the tail 162 may generally align when being gripped by the jaws 216, 218 of the clamp 214. In the example illustrated in FIG. 7D, the second jaw 218 has a clamping surface 222b onto which the tail 162 may be pushed flat against when gripped by the clamp 214. The first jaw 216 in the example shown has a concave clamping surface 222a which may allow the tail 162 of the crustacean to rotate relative to the first jaw 216 as it aligns with the clamping surface 222b of the second jaw 218.

Figure 7E:
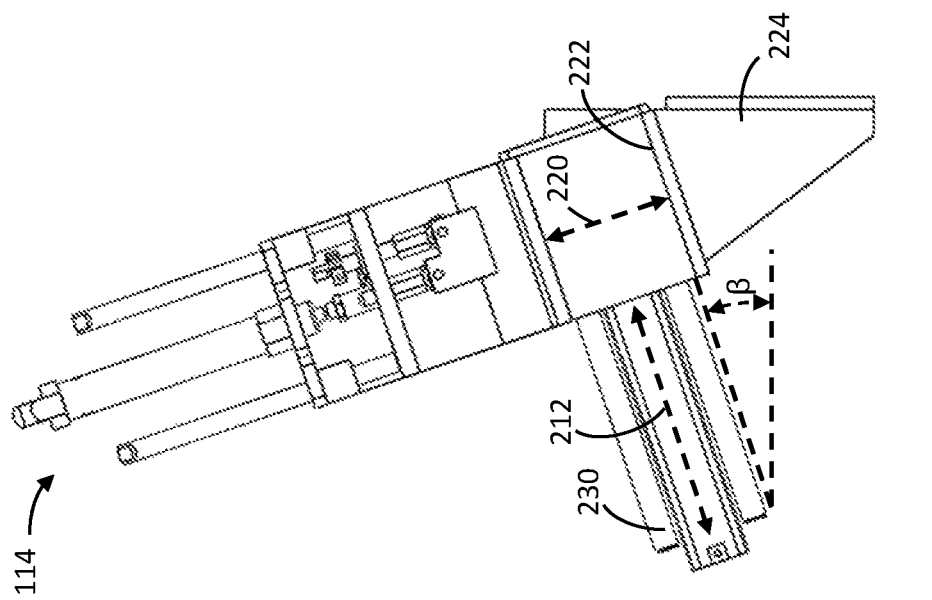
FIG. 7E is a right side view of the tail removing tool of FIG. 7B.

Referring back to FIG. 7A, in the example illustrated, the tail grip 210 is moveable along a pulling path 212. Any actuator suitable for translating the tail grip 210 along the pulling path 212 may be used. In the example shown in FIG. 7B, the tail grip 210 (e.g., clamp 214) is moveable along a track 230 by an actuator. As shown in FIG. 7E, when the tail grip 210 is configured as a clamp 214, the pulling path 212 may be perpendicular to the clamping axis 220.

Accordingly, the tail removing tool 114 illustrated in FIG. 7B, can (a) grip the tail 162 of a crustacean between the upper and lower jaws 216, 218 of the clamp 214; and (b) pull the gripped tail 162 away from the carapace 160 of the crustacean to separate the tail 162 of the crustacean from the carapace 160 thereof.

Optionally, as shown in FIG. 7A, when secured to the frame 122 of the crustacean butchering apparatus 100, the clamp 214 may be positioned relative to the conveyor 130 (specifically a crustacean carrying surface 132 of the conveyor 130) such that the clamping surface 222 is rotated relative to the crustacean carrying surface 132. It may be desirable to rotate the clamping surface 222 relative to the crustacean carrying surface 132 so that as the clamp 214 closes about the tail 162 and aligns the tail 162 with the clamping surface 222, the tail 162 will twist relative to the carapace 160 (i.e., twist about a longitudinal axis of the crustacean). It has been found that twisting the tail 162 of the crustacean relative to its carapace 160 may increase the likeliness of separating the tail 162 from the carapace 160 when pulling the tail 162 away from the carapace 160. In alternative embodiments, the clamping surface 222 may not be rotated relative to the crustacean carrying surface 132.

Figure 7D:
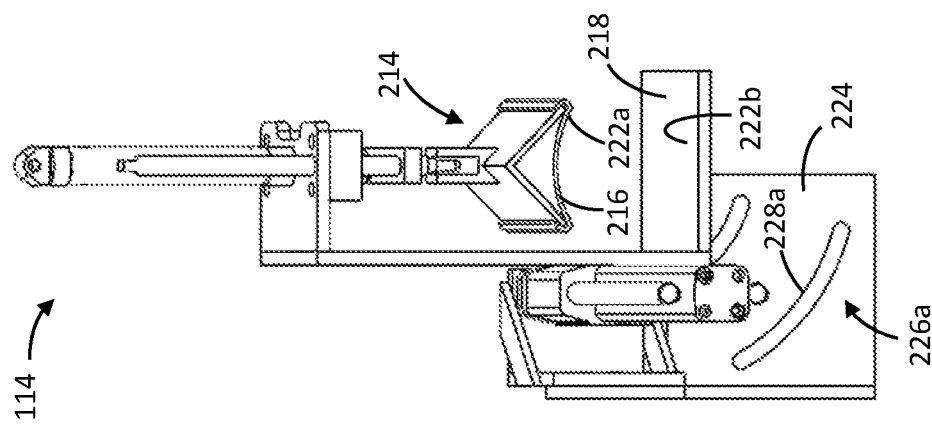
FIG. 7D is a rear view of the tail removing tool of FIG. 7B.

The degree of rotation of the clamping surface 222 relative to the crustacean carrying surface 132 may be adjustable. Referring to FIG. 7D, in the example illustrated, the tail removing tool 114 includes a frame mount 224 which may be fixedly coupled to the frame 122 of the crustacean butchering apparatus 100 and the tail grip 210 (e.g., clamp 214) is rotatable about the frame mount 224. More specifically, in the example illustrated, the tail grip 210 is secured to the frame mount 224 by a pin and slot connection 226a. As shown in FIG. 7D, slots 228a of the pin and slot connection 226b may be curved which may allow for an operator of the crustacean butchering apparatus 100 to reposition (i.e., rotate) the tail grip 210 relative to the frame mount 224, which when frame mount 224 is secured to the frame 122 of the crustacean butchering apparatus 100 will result in a rotation of the clamping surface 222 relative to the crustacean carrying surface 132.

Referring back to FIG. 7A, the clamping surface 222 may extend downwardly away from the conveyor 130 in the cross-machine direction 106 (see angle β in FIG. 7E). In some embodiments, the angle β may be between 0° and 120°, such as 10°-110°, or 30°-90°. In some cases, angle β may be greater than zero. Accordingly, the clamp 214 may bend the tail 162 downwardly relative to the carapace 160 as the clamp 214 grips the tail 162 between the upper and lower jaws 216, 218. It has been found that bending the tail 162 away from the crustacean relative to its carapace 160 may increase the likeliness of separating the tail 162 from the carapace 160 when pulling the tail 162 away from the carapace 160.

Figure 7C:
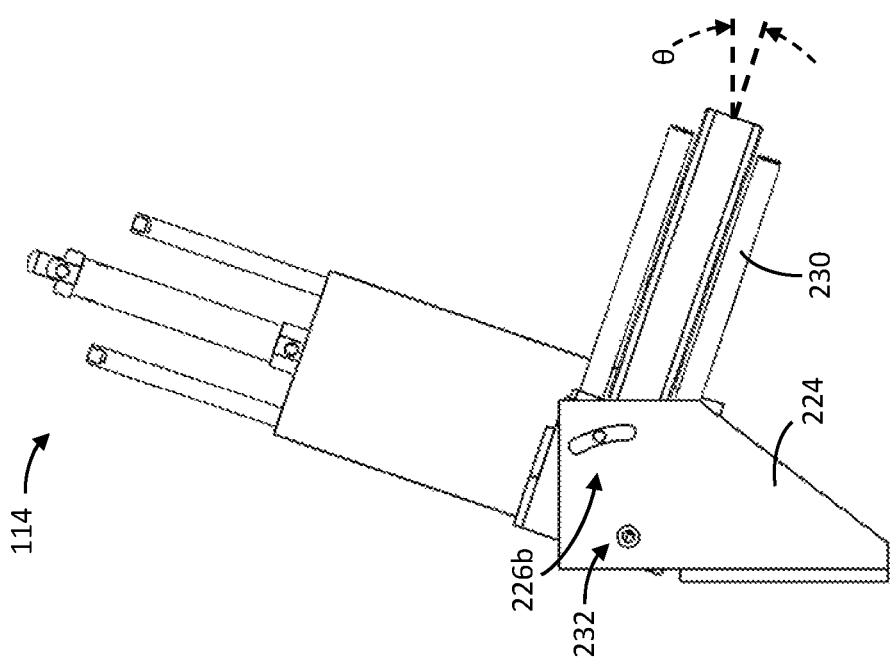
FIG. 7C is a left side view of the tail removing tool of FIG. 7B.

As shown in FIG. 7A, the pulling path 212 of the tail grip 210 may extend downwardly away from the conveyor 130 in the cross-machine direction 106 (see angle θ in FIG. 7C). In some embodiments, the angle θ may be between 0° and 120°, such as 10°-110°, or 30°-90°. In some cases, angle θ may be greater than 0°. As shown in FIG. 7E, the pulling path 212 and the clamping surface 222 may extend downwardly at the same angle. It is to be understood that the pulling path 212 and the clamping surface 222 may not be parallel in other examples. It has been found that pulling the tail 162 at a downward angle relative to the carapace 160 may increase the likeliness of separating the tail 162 from the carapace 160.

Optionally, the angle of the pulling path 212 and/or the clamping surface 222 relative to the crustacean carrying surface 132 may be adjustable. As shown in FIG. 7C, rotation of the pulling path 212 and/or the clamping surface 222 may be provided by pivotally connecting the clamp 214 and/or the track 230 to the frame mount 224 at a pivot joint 232. Optionally, as shown, the clamp 214 and/or the track 230 may be joined to the frame mount 224 by a pin and slot connection 226b to limit the amount the clamp 214 and/or track 230 may rotate relative to the frame mount 224. In alternative embodiments, the angle of the pulling path 212 and/or the clamping surface 222 may not extend downwardly away from the conveyor 130 in the cross-machine direction. In some embodiments, the pulling path 212 and/or the clamping surface 222 may be parallel with the crustacean carrying surface 132 of the conveyor 130.

Figure 8:
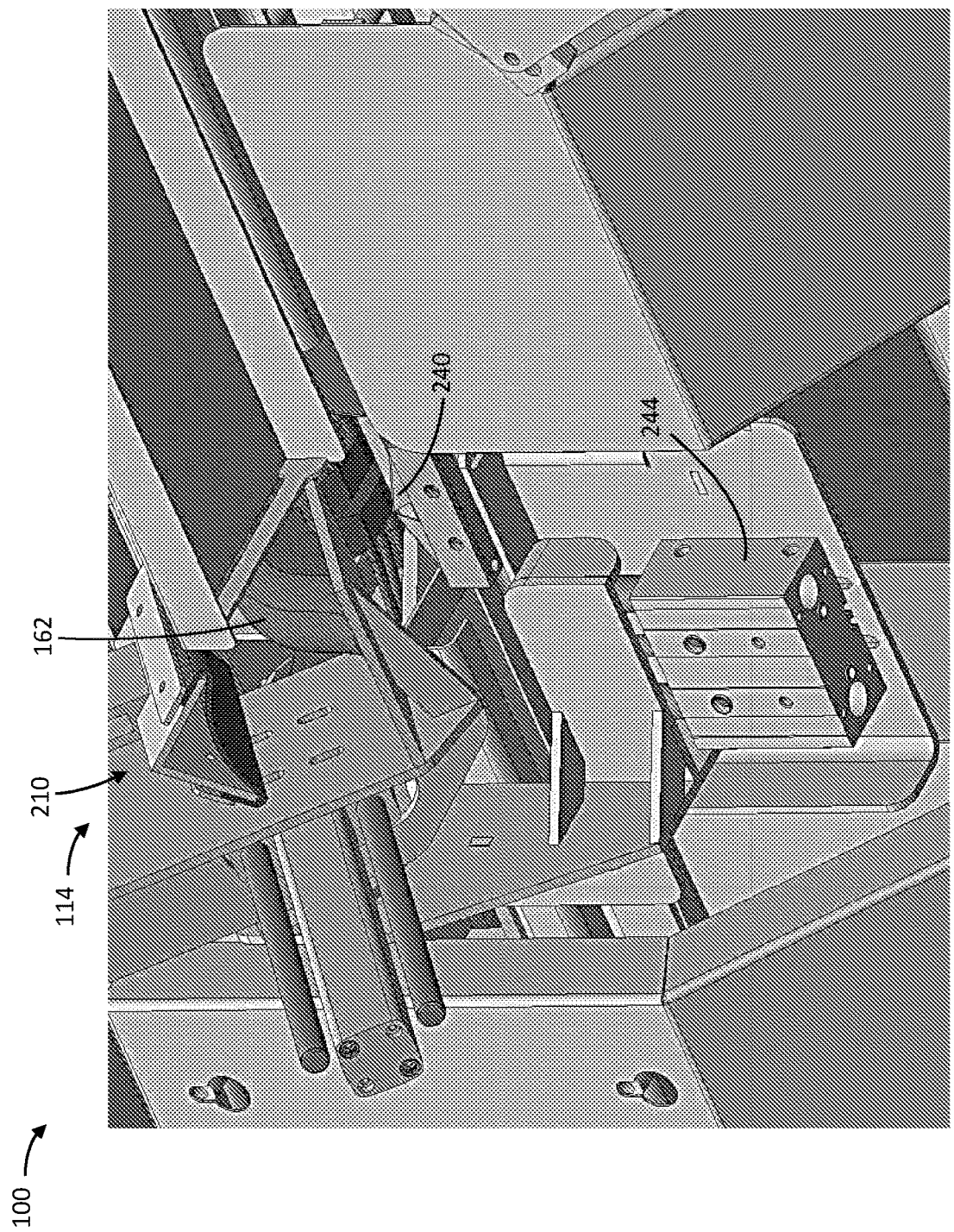
FIG. 8 is a rear perspective view of an alternative embodiment of a tail removing tool.

Referring now to FIG. 8, a blade 240 may optionally be positioned along the pulling path 212 which may cut into the crustacean as the tail 162 is being pulled away from the carapace 160. More specifically, the blade 240 may puncture a membrane that extends between the tail 162 and the body 164 within the carapace 160 of the crustacean to increase the likeliness of separating the tail 162 from the carapace 160 during the pulling process.

In some examples, the blade 240 may be moveable between a retracted position and an extended position. As shown in FIG. 8, in the retracted position, the blade 240 may be clear of the crustacean and in the extended position, the blade 240 may puncture the crustacean (optionally between the tail 162 and the carapace 160). In other examples, the tail grip 210 (e.g., clamp 214) may be moveably mounted such that the tail grip 210 may move toward the blade 240, causing the blade 240 to puncture the crustacean. In the example illustrated, the clamp 214 is displaceable between 20 mm and 70 mm by an actuator 244 in the vertical direction relative to the blade 240 and the crustacean carrying surface 132. It will be appreciated that the tail grip 210 may be configured to move in the vertical direction in examples of the crustacean butchering apparatus 100 that do not include a blade 240 for puncturing the crustacean.

The crustacean butchering apparatus 100 may be configured such that the blade 240 punctures the crustacean after the tail 162 has been gripped but before the tail 162 is pulled away from the carapace 160. However, it will be appreciated that the blade 240 may puncture the crustacean before the tail 162 is gripped.

Figure 9:
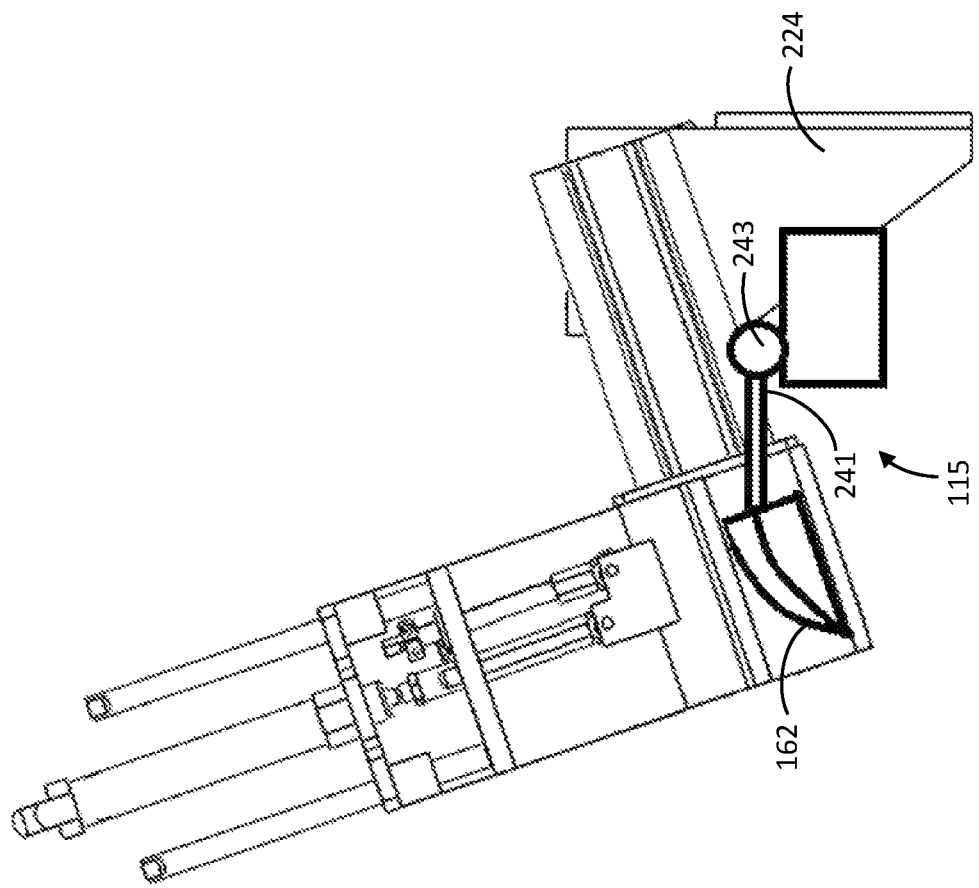
FIG. 9 is a right side view of an alternative embodiment of a tail removing tool including a tail vein removing tool.

Referring now to FIG. 9, the tail removing tool 114 may include tail vein removing tool 115. The tail vein removing tool 115 may remove a vein that is commonly found in the tail 162 of a crustacean. The tail vein removing tool 115 may remove the vein from either end of the tail 162. The tail vein removing tool 115 may remove the tail vein before or after the tail 162 has been separated from the carapace 160. Tail vein removing tool 115 may have any design suitable for removing the tail vein from the tail 162 of a crustacean.

As shown in FIG. 9, the tail vein removing tool 115 may include a vacuum tube 241 for sucking the vein out from the tail 162. Alternatively or in addition, the tail vein removing tool 115 may include a spray nozzle for spraying a fluid and/or air into the tail 162 to urge the vein out from the tail 162. As shown in FIG. 9, in some examples, a portion of the tail vein removing tool 115 may be inserted into the tail 162 to remove the vein. Optionally, the tail vein removing tool 115 may be repositionable by an actuator 243 between a first position in which the portion of the tail removing tool 115 is external the tail 162 to a second position in which the portion of the tail removing tool 115 is inserted into the tail 162 (as shown in FIG. 9).

The tail vein removing tool 115 may be positioned at any location along the processing path 102 of the crustacean butchering apparatus 100. Optionally, the tail vein removing tool 115 may be mounted to the frame mount 224 of the tail removing tool 114. It is to be understood that the tail vein removing tool 115 may not be a portion of the tail removing tool 114 and may be a separate tool entirely.

Figure 13:
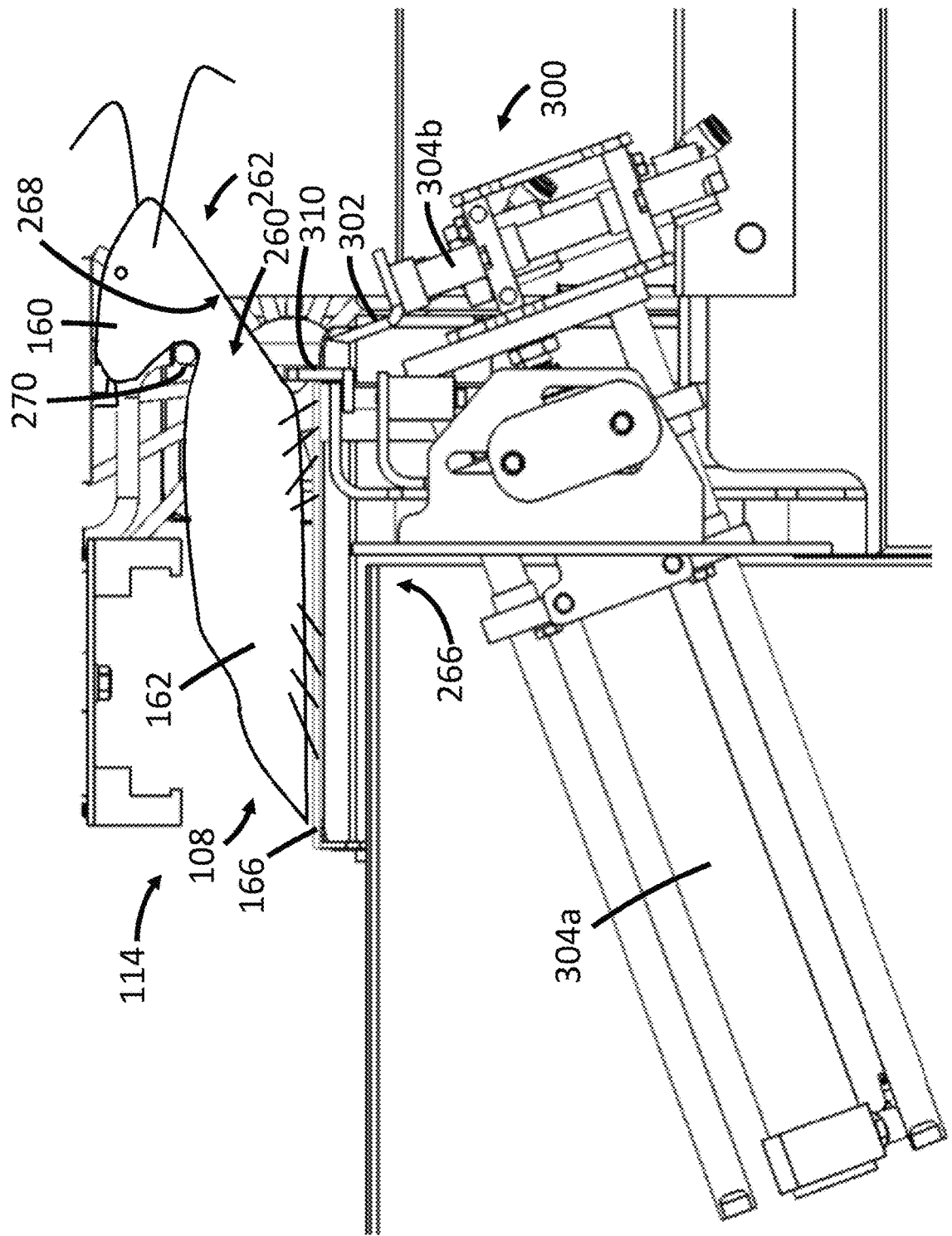
FIG. 13 is a cross-sectional view of the tail removing tool of FIG. 10A, taken along line 12-12, shown with the ripper in a starting position, the belt and barriers removed to provide a clearer view of the elements of the apparatus, and shown with a crustacean to be butchered.

Referring now to FIG. 10A, a second example of a tail removing tool 114 is illustrated. As shown, the tail removing tool 114 may include a tail pulling slot 260. The tail pulling slot 260 is sized and shaped to pinch a crustacean (e.g., a lobster 108) between the tail 162 and the carapace 160. Accordingly, when a crustacean is received by the tail pulling slot 260 (see e.g., FIG. 13) and a pulling force is applied to a body end 262 of the crustacean, the tail 162 may be separated from the body 264 of the crustacean. That is, the tail pulling slot 260 may grip (i.e., pinch) the crustacean so that the tail 108 remains on a first side 266 of the tail pulling slot 260 when the body end 262 is pulled away from the tail pulling slot 260 on a second side 268 of the tail pulling slot 260.

Still referring to FIG. 10A, in the example illustrated, the tail pulling slot 260 is the opening between the tail support surface 166 and a pinching bar 270. In other examples, the tail pulling slot 260 may be defined by two pinching bars. In some examples, the tail pulling slot 260 may be defined by an opening between two planar walls (i.e., the tail pulling slot 260 may resemble a window in a wall).

The tailing pulling slot 260 extends in the machine direction 104 from an upstream slot end 272 to a downstream slot end 274. The upstream slot end 272 receives the crustacean to be butchered as it travels in the machine direction 104 along the processing path 102.

Figure 12A:
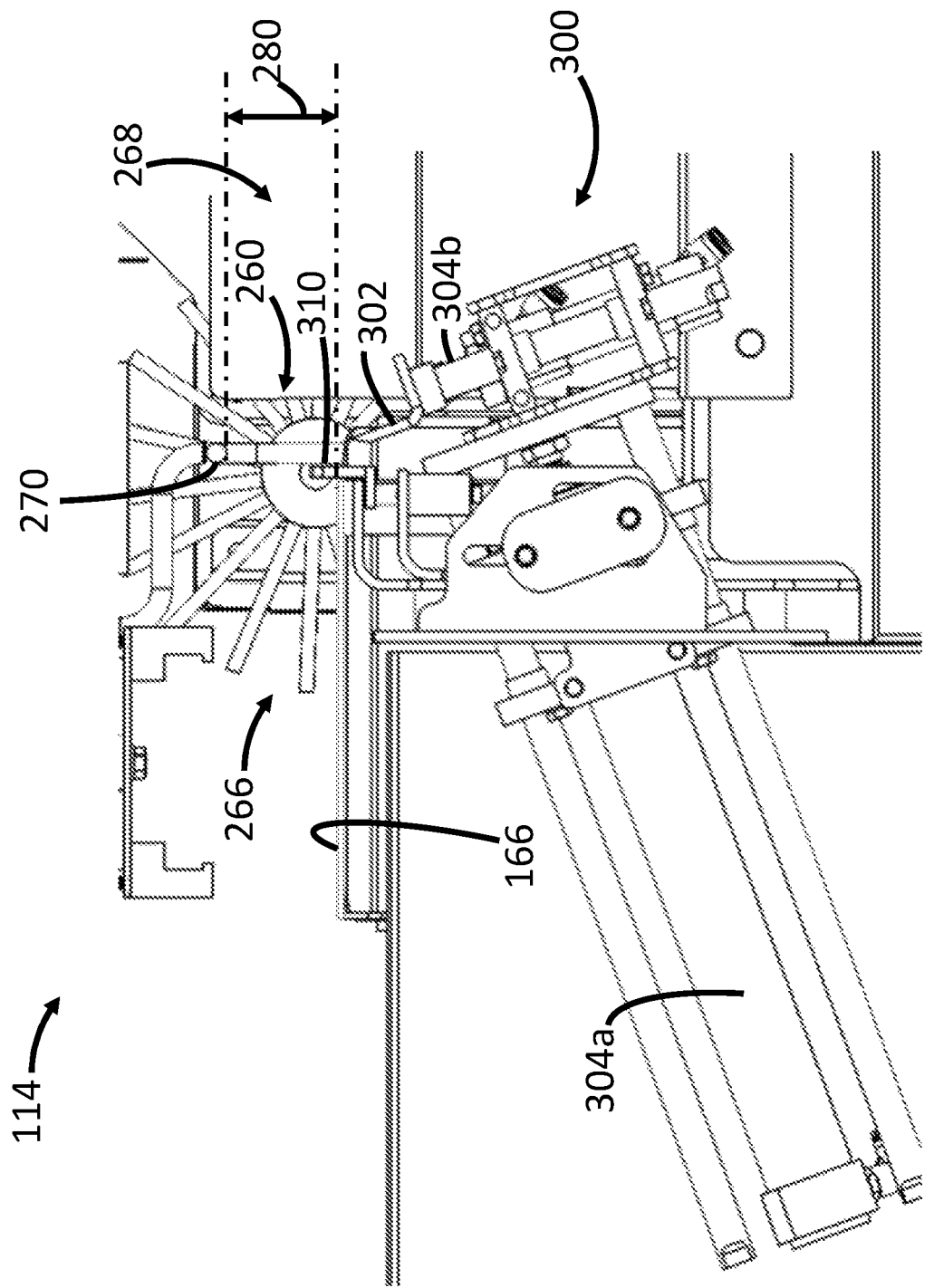
FIG. 12A is a cross-sectional view of the tail removing tool of FIG. 10A, taken along line 12-12, shown with the ripper in a starting position and the belt and barriers removed to provide a clearer view of the elements of the apparatus.

With reference to FIGS. 10A and 12A the tail pulling slot has a slot height 280. As shown, the slot height 280 may be measured transverse to the machine direction 104 and the cross-machine direction 106 and is measured from a slot proximal side 282 of the tail pulling slot 260 (i.e., a side of the tail pulling slot 260 closer to the conveyor 130) to a slot distal side 284 of the tail pulling slot 260 (i.e., a side of the tail pulling slot 260 further from the conveyor 130). In the example shown, the slot proximal side 282 is defined by the pinching bar 270 and the slot distal side 284 is defined by the tail support surface 166.

As shown in FIG. 10A (with additional reference to FIG. 10C), a distance 288 between the slot proximal side 282 and the conveyor 130 (belt 134a of conveyor 130 in the example illustrated) increases between the upstream slot end 272 and the downstream slot end 274 towards the downstream slot end 274. Accordingly, when a crustacean to be butchered is carried along the processing path 102 in the machine direction 104 with the carapace 160 thereof secured to the conveyor 130, the tail 162 of the crustacean may be pulled away from the body end 262 because (a) the tail 162 is secured on one side of the tail pulling slot 260 as a result of the crustacean being pinched by the tail pulling slot 260; and (b) the tail 162 is pulled away from the body 164 due to the increasing distance 288 between the slot proximal side 282 and the conveyor 130 to which the carapace of the crustacean is secured.

Figure 10D:
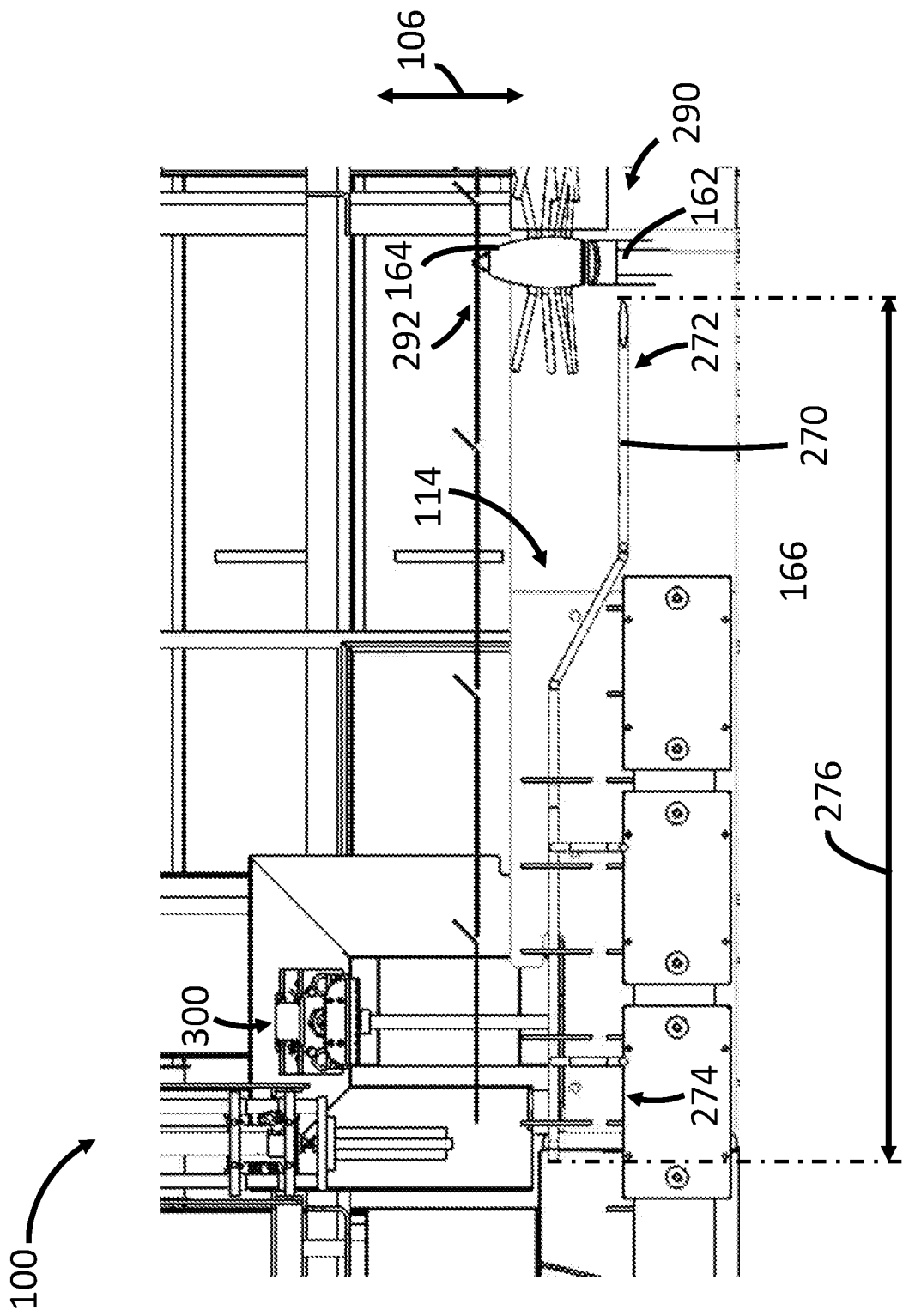
FIG. 10D is a top cross-sectional view of the tailing removing tool of FIG. 10A, taken along line 10-10.

Optionally, as shown in FIG. 10D, the position of the tail pulling slot 260 relative to the conveyor 130 (and therefore the crustacean to be butchered) in the cross-machine direction 106 may vary along a length 276 of the tail pulling slot 260. In the example shown, the tail pulling slot 260 bends in the cross-machine direction 106 from a tail proximate side 290 of the crustacean to a head proximate side 292 of the crustacean. It may be desirable for the tail pulling slot 260 to bend in the cross-machine direction 106 in this way to increase the likeliness of the tail pulling slot 260 engaging the crustacean directly between the tail and the carapace thereof. When pinched directly between the tail and the carapace, the likeliness of tail removing tool 114 separating the tail 162 from the body 164 may increase.

In some examples, the distance 288 between the slot proximate side 282 and the conveyor 130 may increase to a point at which the tail 162 fully separates from the body 164 as the crustacean passes through the tail remover 114. In other examples, the distance 288 between the slot proximal side 282 and the conveyor 130 may not increase to a point at which the tail 162 fully separates from the body 164.

Optionally, as shown in FIG. 10A, the tail removing tool 114 may include a ripper 300 to promote separation of the tail 162 from the body 164 of the crustacean. The ripper 300 may begin at a starting position (see, e.g., FIG. 10B), engage the body 164 of the crustacean as it moves away from the starting position and pull the body 164 of the crustacean away from the tail 162 as the ripper 300 moves to a ripping complete position (see, e.g., FIG. 10C).

In the example illustrated, the ripper 300 includes a blade 302 (optionally toothed as shown) which may grip the ventral side of the crustacean as the ripper moves away from the starting position to grip and pull the body 164 of the crustacean away from the tail 162 of the crustacean which is secured on the opposite side of the tail removing slot 260 from the ripper 300. While the example shows a toothed blade 302, in other examples a hook or a clamp may be used to grip and pull the body 164 of crustacean.

Figure 11:
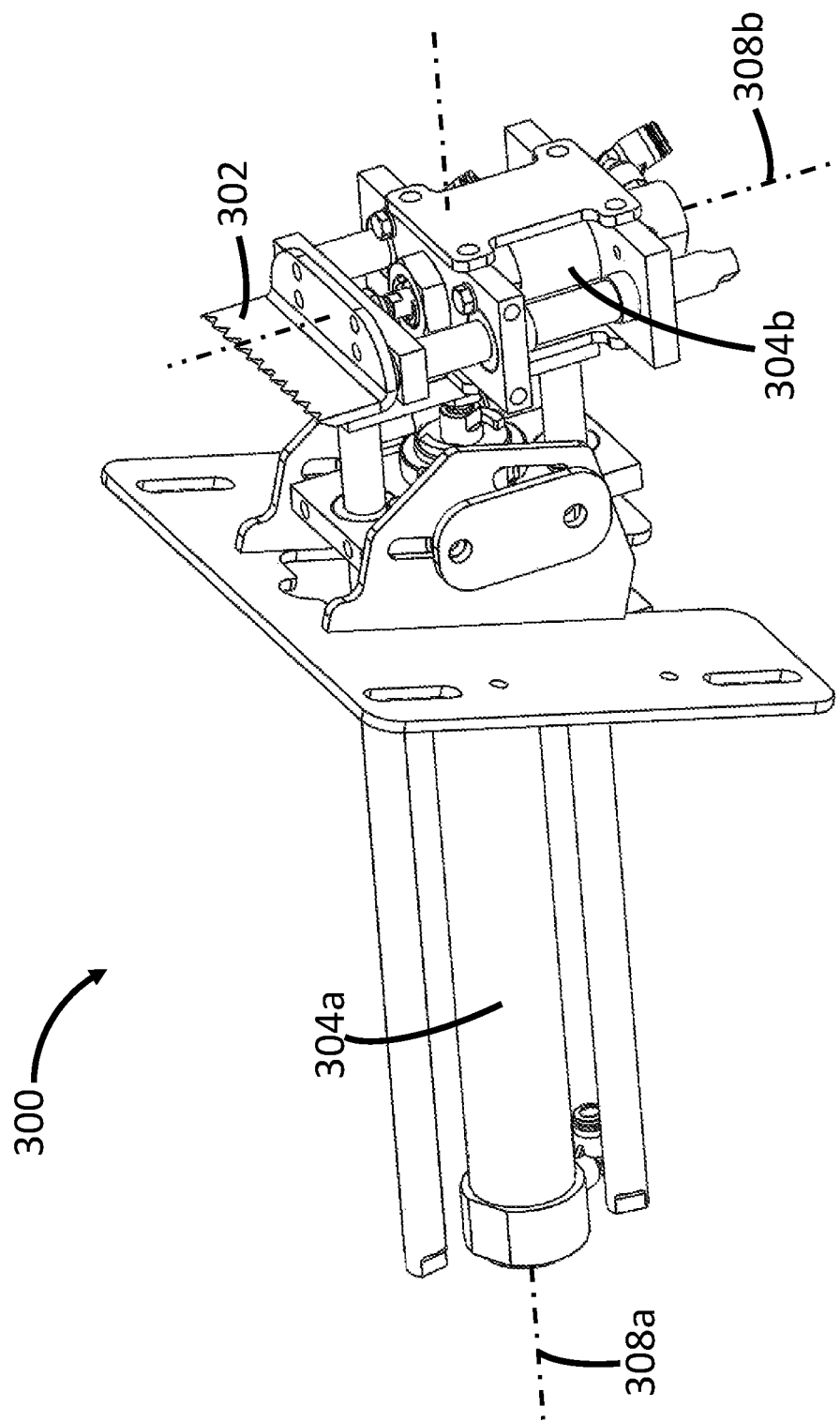
FIG. 11 is a perspective view of a ripper of the tail removing tool of FIG. 10A.

Referring now to FIG. 11, the ripper 300 may include a plurality of actuators 304 to move the toothed blade 302 of the ripper 300 from the starting position to the ripping complete position. In the example illustrated, the ripper 300 includes a first actuator 304a having a first actuator axis 308a and a second actuator 304b having a second actuator axis 308b transverse to the first actuator axis 308a. Accordingly, the first and second actuators 304a, 304b may cooperate to move the toothed bladed 302 in a non-linear path. In the example shown, each of the first and second actuators 304a, 304b are pneumatic cylinders. In other examples, the actuators 304 may be servo motors, hydraulic cylinders or any other actuator known in the art capable of moving the ripper between a starting position and a ripping complete position.

Figure 12B:
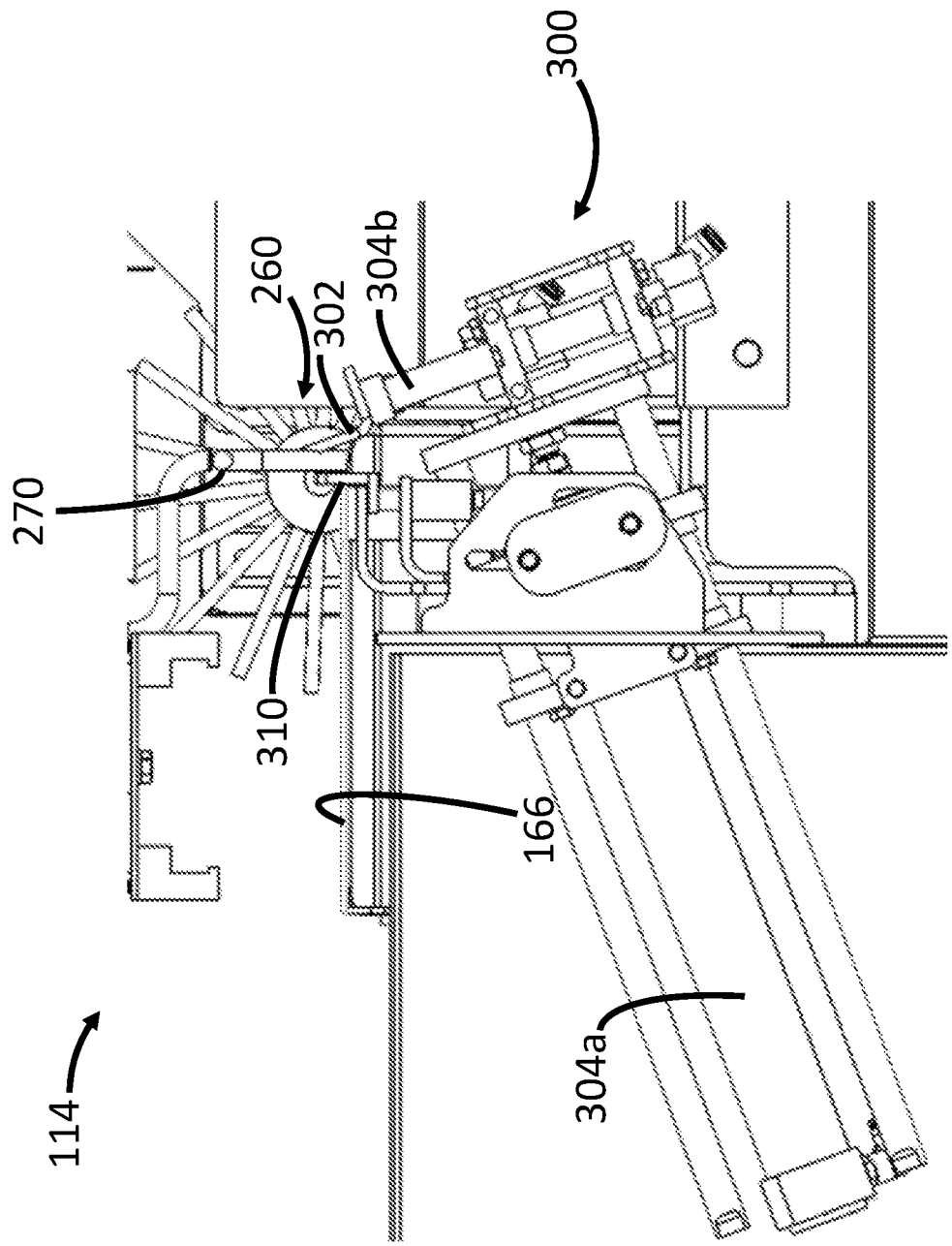
FIG. 12B is a side view of the tail removing tool of FIG. 12A, shown with the ripper in an engagement position.
Figure 12C:
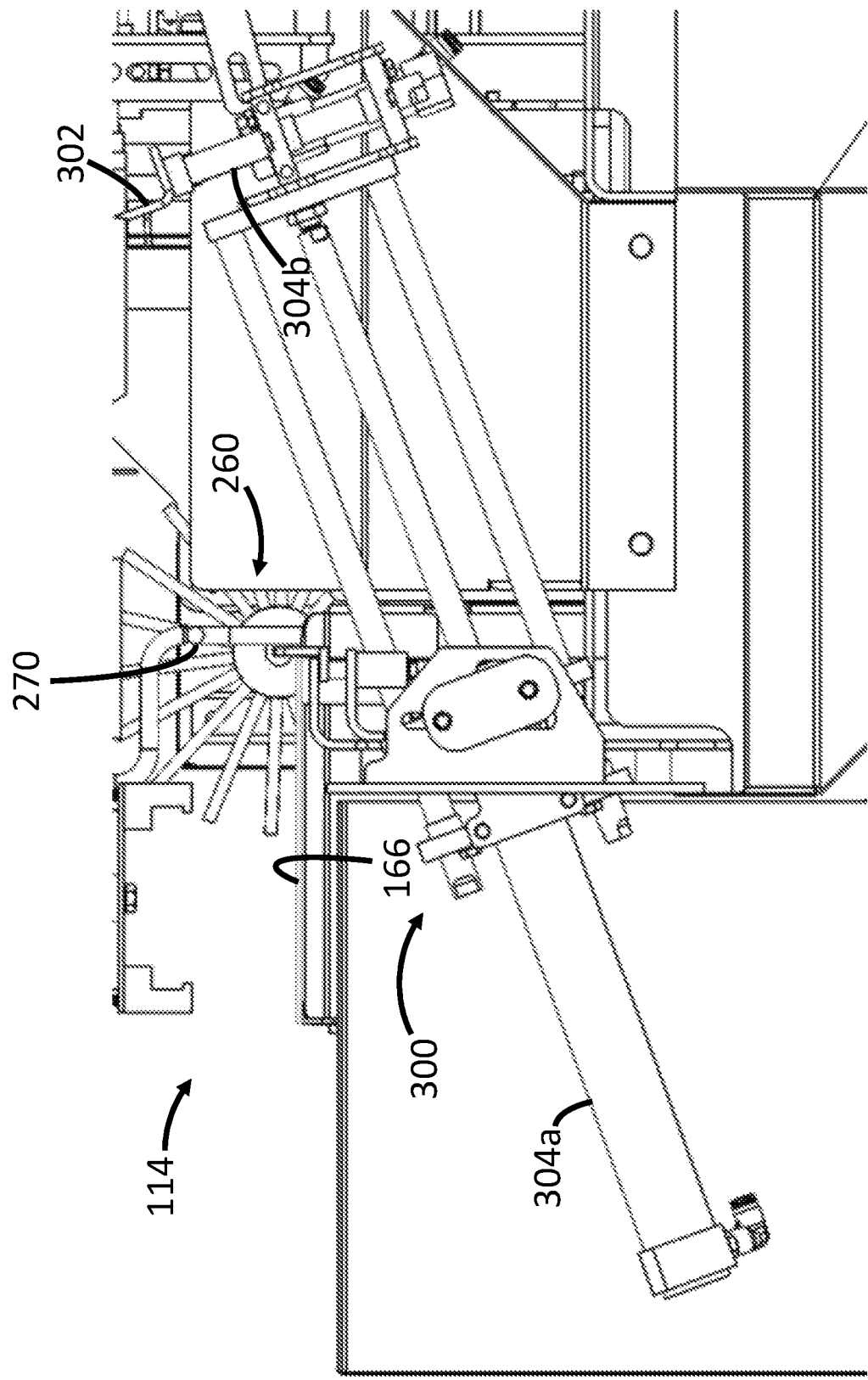
FIG. 12C is a side view of the tail removing tool of FIG. 12A, shown with the ripper in an extended position.
Figure 12D:
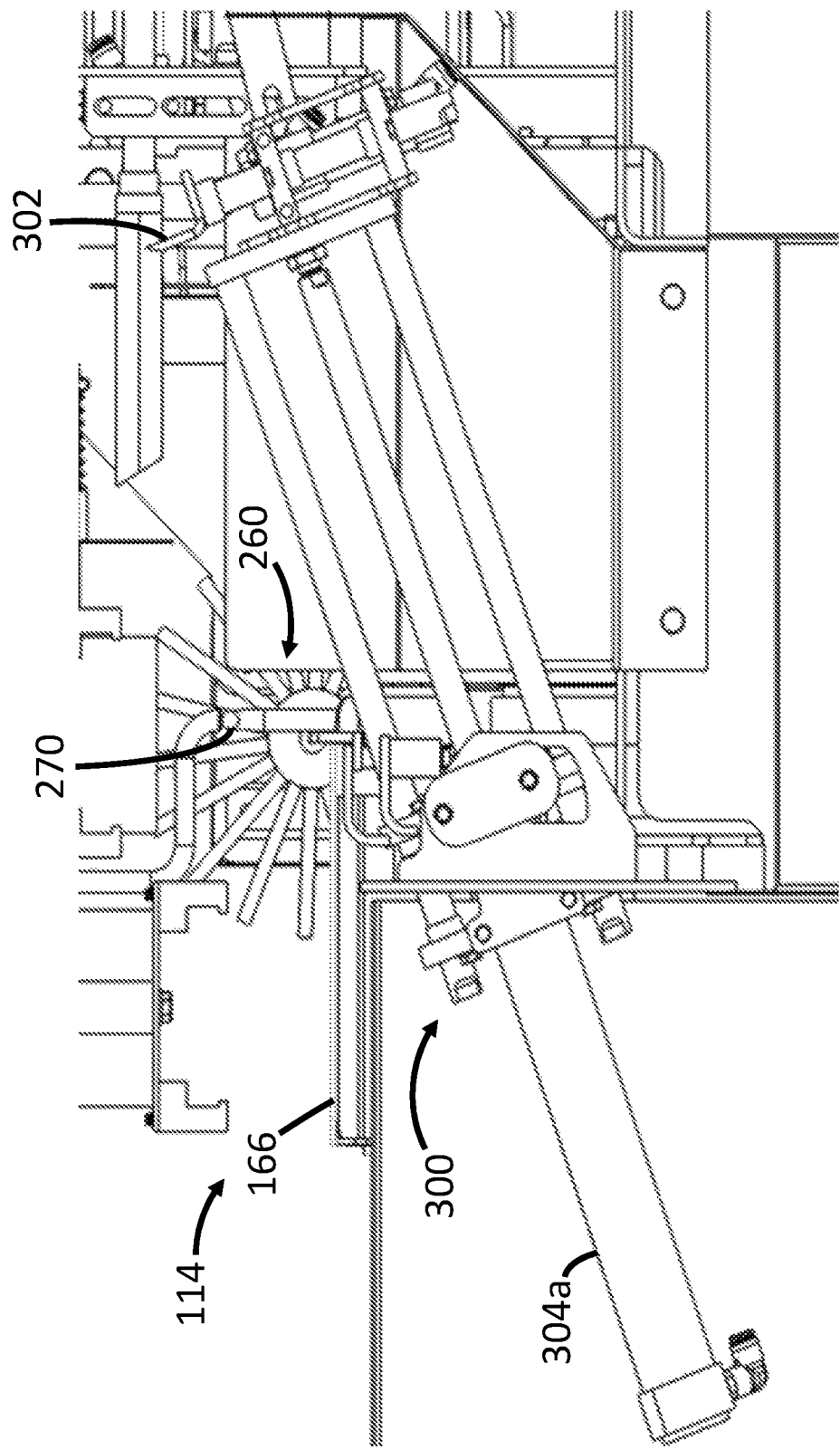
FIG. 12D is a side view of the tail removing tool of FIG. 12A, shown with the ripper in a complete position.

Referring now to FIG. 12A, the ripper 300 is shown in a starting position. When in use, in the starting position, the toothed blade 302 of the ripper 300 is not engaged with the crustacean pinched in the tail pulling slot 260. Referring now to FIG. 12B, the ripper 300 is shown in a crustacean engagement position. When in use, in the crustacean engagement position, the toothed blade 300 may engage (e.g., grip, tear into) the ventral side of the body 164 of the crustacean pinched in the tail pulling slot 260. Referring now to FIG. 12C, the ripper 300 is shown in an extended position. It will be appreciated that as the toothed blade 300 moves from the crustacean engagement position (FIG. 12B) to the extended position (FIG. 12C), the body 164 of the crustacean hooked by the tooth blade 300 may be pulled away from the tail 162 of the crustacean held on the opposite side of the tail pulling slot 260. Referring now to FIG. 12D, the ripper 300 illustrated is shown in a ripping complete position. From the ripping complete position, the ripper 300 may return to the starting position to complete a ripping cycle.

Optionally, as shown in FIG. 10A, a fence 310 may extend into the tail pulling slot 260 at the position along the processing path 102 the ripper 300 tears the body 164 away from the tail 162 of the crustacean. The fence 310 may further pinch the crustacean to reduce the likeliness of the tail 162 being pulled through the tail pulling slot 260 as the ripper 300 tears the body away.

Tomalley Removing Tool

Figure 14:
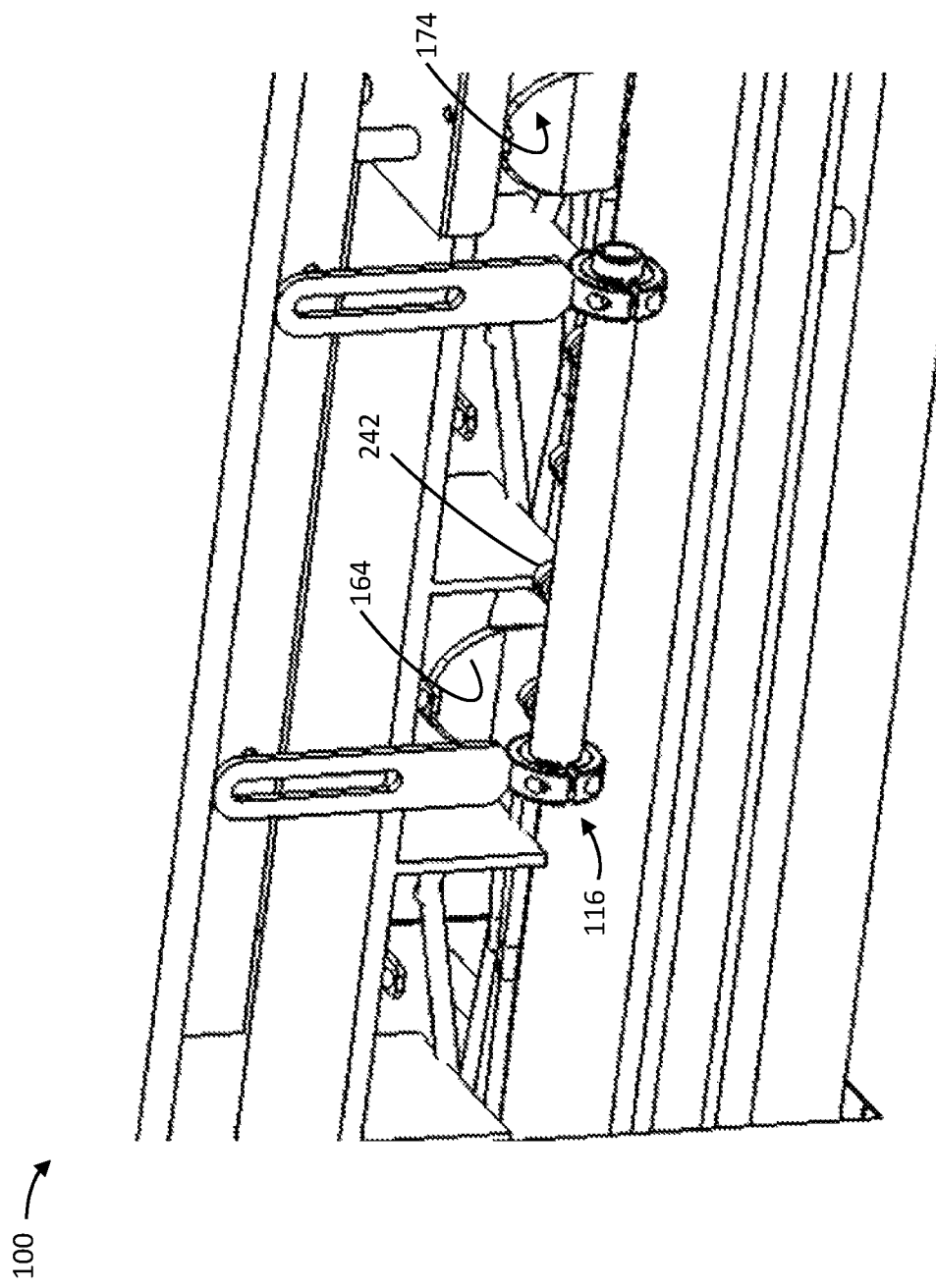
FIG. 14 is a perspective view of a tomalley removing tool of the crustacean butchering apparatus of FIG. 3A.

With reference to FIG. 14, the crustacean butchering apparatus 100 may include a tomalley removing tool 116. The crustacean butchering apparatus 100 may include a tomalley removing tool 116 when the crustacean butchering apparatus 100 is used to butcher lobsters 108 as tomalley is the digestive gland of a lobster 108 located within the carapace 160 thereof. The tomalley removing tool 116 may have any design suitable for removing the tomalley from a respective carapace 160 of a crustacean.

Optionally, the tomalley removing tool 116 may include a vacuum for sucking the tomalley out from the carapace 160. Alternatively or in addition, the tomalley removing tool 116 may include a spray nozzle for spraying a fluid and/or air into the carapace 160 to urge the tomalley out from the carapace 160. In some examples, a portion of the tomalley removing tool 116 may be inserted into the carapace 160 to remove the tomalley. The tomalley removing tool 116 may remove the tomalley from the head end 176 or the tail end 174 of the carapace 160.

An example of a tomalley removing tool 116 is shown in FIG. 14. In the example illustrated in FIG. 14, the tomalley removing tool 116 includes a plurality of nozzles 242 for spraying a fluid (e.g., water) into the carapace 160 after the tail 162 has been removed therefrom. As the fluid is sprayed into the carapace 160, the fluid may flush the tomalley out from the carapace 160.

Optionally, as the tomalley is flushed out from the carapace 160, the tomalley may be captured in a collection chamber from which it may be removed for further processing or marketing.

Body Ejection Tool

Figure 15A:
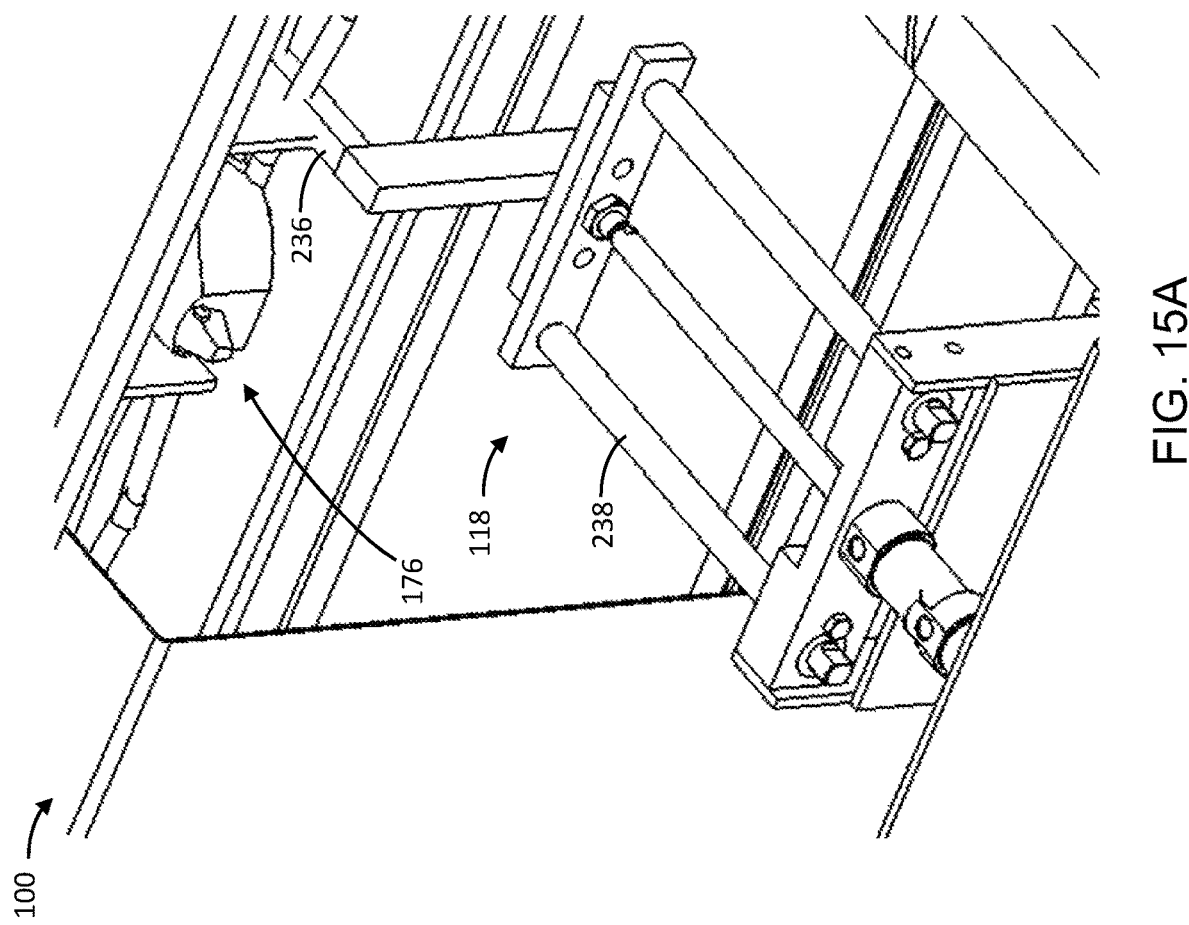
FIG. 15A is a rear perspective view of a body ejection tool of the crustacean butchering apparatus of FIG. 3A.
Figure 15B:
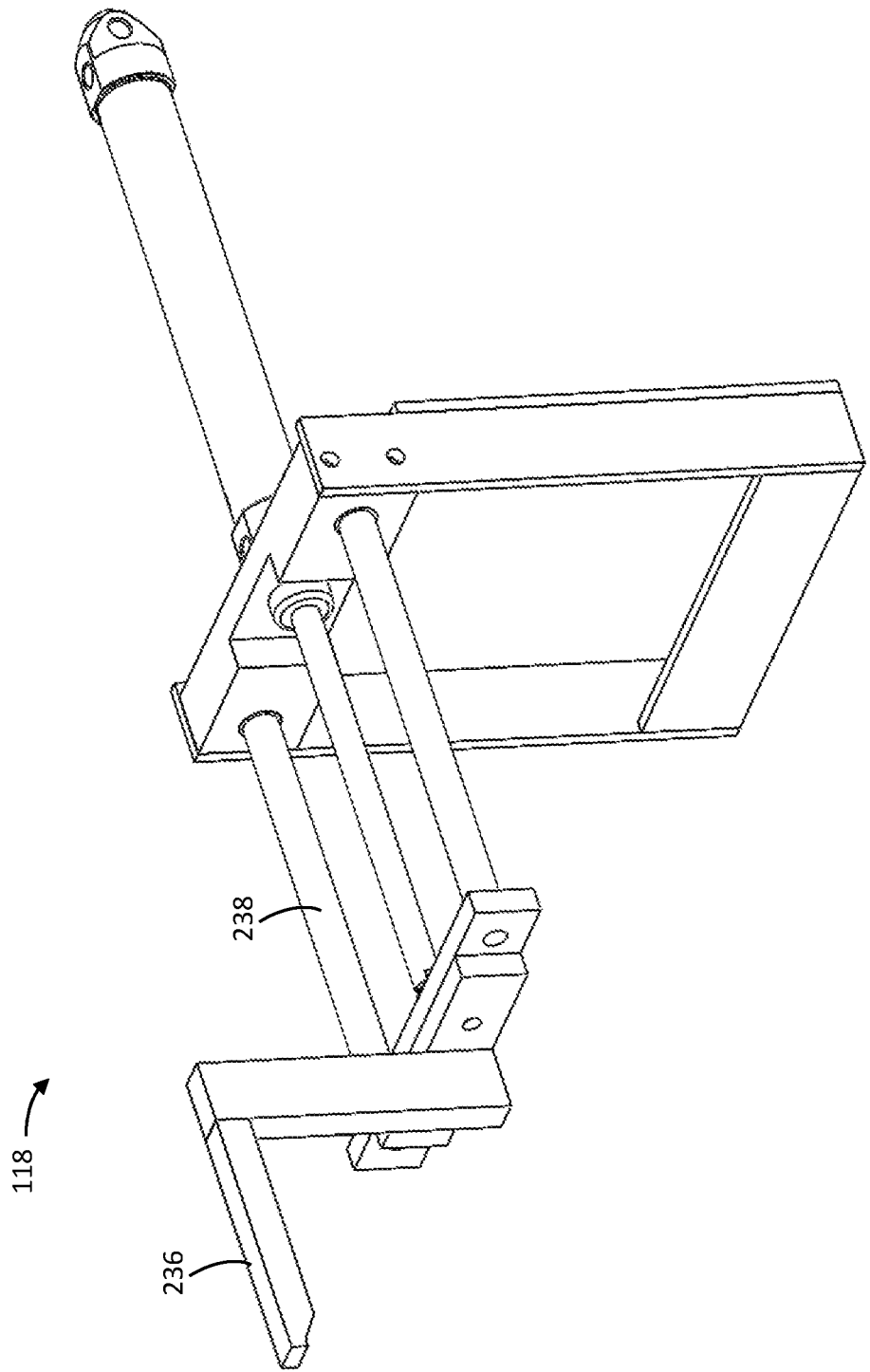
FIG. 15B is a front perspective view of the body ejection tool of FIG. 11A, shown in isolation.

With reference to FIGS. 15A and 15B, the crustacean butchering apparatus 100 may include a body ejection tool 118. The body ejection tool 118 may be operable to remove the body 164 (i.e., meat) from within the carapace 160. The body ejection tool 118 may urge the body 164 out from the head end 176 or the tail end 174 of the carapace 160. Body ejection tool 118 may have any design suitable for ejecting the body 164 from a respective carapace 160 of a crustacean.

An example of a body ejection tool 118 shown in use is illustrated in FIG. 15A. In the example illustrated, the body ejection tool 118 pushes against the head end of the crustacean to urge the body 164 out from the tail end of the crustacean.

Referring now to FIG. 15B, the body ejection tool 118 of FIG. 15A is shown in isolation. As shown, the body ejection tool 118 may have a body push rod 236 connected to a ram 238. The ram 238 may be controlled by any actuator suitable for extending and retracting the ram 238. In the example illustrated the ram 238 is hydraulically controlled. In other embodiments, ram 238 may be pneumatically controlled or mechanically driven by a motor.

Optionally, the body 164 pushed out from the carapace 160 may be collected in a body collection chamber 250 (see, e.g., FIG. 3D) from which it may be removed for further processing or marketing.

When the carapace grip 150 is configured as a spike 152 with a distal end 158 extending in the cross-machine direction 106, as shown in FIG. 1B, optionally, the body ejection tool 118 may push the body 164 in the opposite cross-machine direction 106 to the extension of the distal end 158. That is, for example, if the spike 152 extends generally right to left, the body ejection tool 118 may push the body 164 generally from left to right. Pushing the body 164 in the opposite cross-machine direction 106 to the extension of the distal end 158 of the spike 152 may reduce the likeliness of pushing the carapace 160 off the carapace grip 150 when pushing the body 164 out from the carapace 160.

Carapace Ejection Tool

Figure 16:
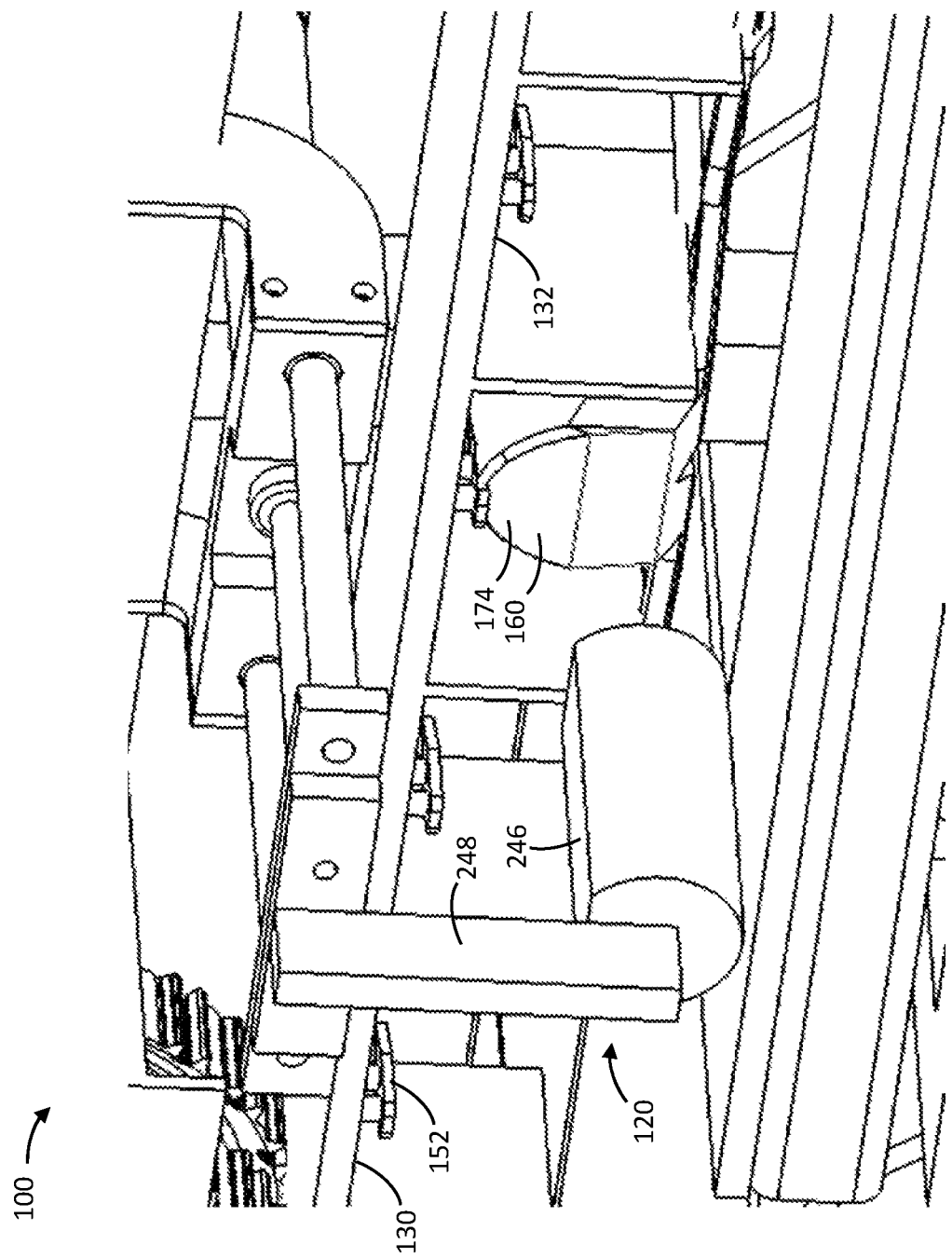
FIG. 16 is a perspective view of a carapace ejection tool of the crustacean butchering apparatus of FIG. 3A.

With reference to FIG. 16, the crustacean butchering apparatus 100 may include a carapace ejection tool 120. The carapace ejection tool 120 may be operable to remove the carapace 160 from the carapace grip 150. The carapace ejection tool 120 may be operable to remove the carapace 160 from the carapace grip 150 in any direction. Carapace ejection tool 120 may have any design suitable for removing the carapace 160 from the carapace grip 150.

An example of a carapace ejection tool 120 in use is shown in FIG. 16. In the example illustrated, the carapace ejection tool 120 has a carapace push rod 246 connected to a ram 248. The carapace push rod 246 may be moveable from a retracted position to an extended position. When moving from the retracted position to the extended position, the carapace push rod 246 may abut the carapace 160 and push the carapace 160 off the carapace grip 150. The carapace push rod 246 may abut the head end 176 or the tail end 174 of the carapace 160. In the example illustrated, the carapace push rod 246 abuts the tail end 174 of the carapace 160 as it moves from the retracted position to the extended position.

Optionally, the carapace separated from the carapace grip 150 may be collected in a carapace collection chamber 252 (see, e.g., FIG. 3D) from which it may be removed for further processing or marketing.

When the carapace grip 150 is configured as a spike 152 as shown in FIG. 1B, with a distal end 158 extending in the cross-machine direction 106, optionally, the carapace ejection tool 120 may push the carapace 160 in the same cross-machine direction 106. That is, for example, if the spike 152 extends generally right to left, the carapace ejection tool 120 may push the carapace 160 generally from right to left. Pushing the carapace 160 in the same cross-machine direction 106 as the extension of the carapace grip 150 may increase the likeliness of pushing the carapace 160 off the carapace grip 150.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

ITEMS

Item 1. A crustacean butchering apparatus comprising:
at least one carapace grip, each carapace grip of the at least one carapace grip sized to secure a carapace of a crustacean to a conveyor, when activated the conveyor carries the crustacean secured by the carapace grip in a machine direction along a processing path;
a claw removing tool positioned along the processing path, when activated the claw removing tool separates a first claw and a second claw of the crustacean from the carapace of the crustacean; and
a tail removing tool positioned along the processing path, when activated the tail removing tool separates a tail of the crustacean from the carapace of the crustacean.

Item 2. The crustacean butchering apparatus of any preceding item, wherein the carapace grip comprises a spike insertable into the crustacean between the carapace and the tail of the crustacean.

Item 3. The crustacean butchering apparatus of any preceding item, wherein a proximal end of the spike is connected to the conveyor and a distal end of the spike extends in a cross-machine direction.

Item 4. The crustacean butchering apparatus of any preceding item, further comprising a claw elastic stripping tool upstream of the claw removing tool, when activated the claw elastic stripping tool removes a first elastic secured around the first claw of the crustacean and a second elastic secured around the second claw of the crustacean.

Item 5. The crustacean butchering apparatus of any preceding item, wherein the claw elastic stripping tool comprises at least one roller having a contact surface engageable with the first and second elastics secured around the first and second claws and when activated and engaged with the first and second claws and the first and second elastics slides the first and second elastics secured around the first and second claws off the first and second claws.

Item 6. The crustacean butchering apparatus of any preceding item, wherein the at least one roller is a first roller and a second roller, the contact surface of the first roller is engageable with a first portion of the first and second elastics on a first side of the first and second claws and the contact surface of the second roller is engageable with a second portion of the first and second elastics on a second side of the first and second claws.

Item 7. The crustacean butchering apparatus of any preceding item, wherein each roller of the at least one roller has a roller axis of rotation and the roller axis of rotation is angled away from the conveyor in the machine direction.

Item 8. The crustacean butchering apparatus of any preceding item, wherein the claw removing tool comprises at least one ram that is moveable between a retracted position and an extended position, each ram of the at least one ram comprising a claw engagement surface to push at least one of the first and second claws in a cross-machine direction toward the carapace of the crustacean when the ram is moved from the retracted position to the extended position.

Item 9. The crustacean butchering apparatus of any preceding item, wherein the at least one ram is a single ram and the single ram has a first engagement surface to push the first claw in a cross-machine direction toward the carapace of the crustacean and a second engagement surface to push the second claw in a cross-machine direction toward the carapace of the crustacean when the ram is moved from the retracted position to the extended position.

Item 10. The crustacean butchering apparatus of any preceding item, wherein the tail removing tool comprises a clamp sized to grip the tail of the crustacean, the clamp is movable in a cross-machine direction along a pulling path from a retracted position away from the conveyor to an extended position to pull the tail of the crustacean away from the carapace of the crustacean when the clamp is moved from the retracted position to the extended position.

Item 11. The crustacean butchering apparatus of any preceding item, wherein
the clamp comprises a first jaw moveable relative to a second jaw;
each of the first and second jaws having a clamping surface; and
the clamping surface of at least one of the first and second jaw is rotatable relative to a crustacean carrying surface the conveyor to twist the tail as it is clamped between the first and second jaws relative to the carapace about the cross-machine direction.

Item 12. The crustacean butchering apparatus of any preceding item, wherein the clamping surface of at least one of the first and second jaws is angled downwardly away from the crustacean carrying surface of the conveyor in the cross-machine direction.

Item 13. The crustacean butchering apparatus of any preceding item, wherein the tail removing tool comprises a blade moveable between a retracted position and an extended position, the blade sized and positioned to puncture an underside of the crustacean between the tail and the carapace of the crustacean when moved from the retracted position to the extended position.

Item 14. The crustacean butchering apparatus of any preceding item, wherein the tail removing tool comprises a tail vein removing tool insertable into at least one end of the tail, when inserted into one end of the tail and activated the tail vein removing tool removes a vein from the tail.

Item 15. The crustacean butchering apparatus of any preceding item, wherein the tail removing tool is positioned downstream of the claw removing tool.

Item 16. The crustacean butchering apparatus of any preceding item, further comprising a body ejection tool moveable in the cross-machine direction between a retracted position and an extended positioned, when activated the body ejection tool urges the body of the crustacean out from the carapace.

Item 17. The crustacean butchering apparatus of any preceding item, further comprising carapace ejection tool moveable in the cross-machine direction between a retracted position and an extended positioned, when activated the carapace ejection tool urges the carapace off the spike.

Item 18. The crustacean butchering apparatus of any preceding item, further comprising a tomalley removing tool positioned downstream of the tail removing tool, when activated the tomalley removing tool removes tomalley from the carapace.

Item 19. The crustacean butchering apparatus of any preceding item, further comprising a claw sorter for sorting the claws by size.

Item 20. The crustacean butchering apparatus of any preceding item, wherein the conveyor has a crustacean carrying surface and the crustacean carrying surface is upwardly facing upstream of the claw removing tool and is downwardly facing at the claw removing tool and the tail removing tool.

Item 21. The crustacean butchering apparatus of any preceding item, wherein the tail removing tool comprises:
a tail pulling slot extending in the machine direction from an upstream slot end to a downstream slot end and having a slot height sized to pinch the crustacean between the tail and the carapace,
the slot height being transverse to the machine direction and a cross-machine direction,
the slot height measured from a slot proximal side to a slot distal side, the slot proximal side being closer to the conveyor than the conveyor is to the slot distal side,
a distance between the slot proximal side and the conveyor increases between the upstream slot end and the downstream slot end.
a ripper drivingly coupled to one or more actuators, the one or more actuators when activated collectively move the ripper from a starting position to a crustacean engagement position and then to a ripping complete position.

Item 22. The crustacean butchering apparatus of any preceding item, wherein the ripper comprises a toothed blade for engaging the crustacean.

Item 23. The crustacean butchering apparatus of any preceding item, wherein movement of the ripper from the starting position to the ripping complete position moves the toothed blade in a non-linear path.

Item 24. The crustacean butchering apparatus of any preceding item, wherein the tail removing tool comprises a fence extending into the tail pulling slot, at least a portion of the fence is aligned with the ripper in the machine direction.

Item 25. The crustacean butchering apparatus of any preceding item, wherein the slot proximal side is defined by a pinching bar.

Item 26. A crustacean butchering apparatus comprising:
- at least one carapace grip, each carapace grip of the at least one carapace grip sized to secure a carapace of a crustacean to a conveyor, when activated the conveyor carries the crustacean secured by the carapace grip in a machine direction along a processing path; and
- a tail removing tool positioned along the processing path, the tail removing tool having:
  - a tail pulling slot extending in the machine direction from an upstream slot end to a downstream slot end and having a slot height sized to pinch the crustacean between the tail and the carapace,
  - the slot height being transverse to the machine direction and a cross-machine direction,
  - the slot height measured from a slot proximal side to a slot distal side, the slot proximal side being closer to the conveyor than the conveyor is to the slot distal side,
  - a distance between the slot proximal side and the conveyor increases between the upstream slot end and the downstream slot end,
  - when activated the tail removing tool separates a tail of the crustacean from the carapace of the crustacean.

The invention claimed is:

1. A crustacean butchering apparatus comprising:
at least one carapace grip, each carapace grip of the at least one carapace grip sized to secure a carapace of a crustacean to a conveyor, when activated the conveyor carries the crustacean secured by the carapace grip in a machine direction along a processing path;
a claw removing tool positioned along the processing path, when activated the claw removing tool separates a first claw and a second claw of the crustacean from the carapace of the crustacean; and
a tail removing tool positioned along the processing path, when activated the tail removing tool separates a tail of the crustacean from the carapace of the crustacean.

2. The crustacean butchering apparatus of claim 1, wherein the carapace grip comprises a spike insertable into the crustacean between the carapace and the tail of the crustacean, wherein a proximal end of the spike is connected to the conveyor and a distal end of the spike extends in a cross-machine direction.

3. The crustacean butchering apparatus of claim 2, further comprising carapace ejection tool moveable in the cross-machine direction between a retracted position and an extended positioned, when activated the carapace ejection tool urges the carapace off the spike.

4. The crustacean butchering apparatus of claim 1, further comprising a claw elastic stripping tool upstream of the claw removing tool, when activated the claw elastic stripping tool removes a first elastic secured around the first claw of the crustacean and a second elastic secured around the second claw of the crustacean and wherein the claw elastic stripping tool comprises at least one roller having a contact surface engageable with the first and second elastics secured around the first and second claws and when activated and engaged with the first and second claws and the first and second elastics slides the first and second elastics secured around the first and second claws off the first and second claws.

5. The crustacean butchering apparatus of claim 4, wherein the at least one roller is a first roller and a second roller, the contact surface of the first roller is engageable with a first portion of the first and second elastics on a first side of the first and second claws and the contact surface of the second roller is engageable with a second portion of the first and second elastics on a second side of the first and second claws.

6. The crustacean butchering apparatus of claim 1, wherein the claw removing tool comprises at least one ram that is moveable between a retracted position and an extended position, each ram of the at least one ram comprising a claw engagement surface to push at least one of the first and second claws in a cross-machine direction toward the carapace of the crustacean when the ram is moved from the retracted position to the extended position.

7. The crustacean butchering apparatus of claim 6, wherein the at least one ram is a single ram and the single ram has a first engagement surface to push the first claw in a cross-machine direction toward the carapace of the crustacean and a second engagement surface to push the second claw in a cross-machine direction toward the carapace of the crustacean when the ram is moved from the retracted position to the extended position.

8. The crustacean butchering apparatus of claim 1, wherein the tail removing tool comprises a clamp sized to grip the tail of the crustacean, the clamp is movable in a cross-machine direction along a pulling path from a retracted position away from the conveyor to an extended position to pull the tail of the crustacean away from the carapace of the crustacean when the clamp is moved from the retracted position to the extended position.

9. The crustacean butchering apparatus of claim 8, wherein
the clamp comprises a first jaw moveable relative to a second jaw;
each of the first and second jaws having a clamping surface; and
the clamping surface of at least one of the first and second jaw is rotatable relative to a crustacean carrying surface the conveyor to twist the tail as it is clamped between the first and second jaws relative to the carapace about the cross-machine direction.

10. The crustacean butchering apparatus of claim 9, wherein the clamping surface of at least one of the first and second jaws is angled downwardly away from the crustacean carrying surface of the conveyor in the cross-machine direction.

11. The crustacean butchering apparatus of claim 8, wherein the tail removing tool comprises a blade moveable between a retracted position and an extended position, the blade sized and positioned to puncture an underside of the crustacean between the tail and the carapace of the crustacean when moved from the retracted position to the extended position.

12. The crustacean butchering apparatus of claim 8, wherein the tail removing tool comprises a tail vein removing tool insertable into at least one end of the tail, when inserted into one end of the tail and activated the tail vein removing tool removes a vein from the tail.

13. The crustacean butchering apparatus of claim 1, further comprising a body ejection tool moveable in the cross-machine direction between a retracted position and an extended positioned, when activated the body ejection tool urges the body of the crustacean out from the carapace.

14. The crustacean butchering apparatus of claim 1, further comprising a tomalley removing tool positioned downstream of the tail removing tool, when activated the tomalley removing tool removes tomalley from the carapace.

15. The crustacean butchering apparatus of claim 1, wherein the conveyor has a crustacean carrying surface and the crustacean carrying surface is upwardly facing upstream of the claw removing tool and is downwardly facing at the claw removing tool and the tail removing tool.

16. The crustacean butchering apparatus of claim 1, wherein the tail removing tool comprises:
- a tail pulling slot extending in the machine direction from an upstream slot end to a downstream slot end and having a slot height sized to pinch the crustacean between the tail and the carapace,
  the slot height being transverse to the machine direction and a cross-machine direction,
  the slot height measured from a slot proximal side to a slot distal side, the slot proximal side being closer to the conveyor than the conveyor is to the slot distal side,
  a distance between the slot proximal side and the conveyor increases between the upstream slot end and the downstream slot end,
- a ripper drivingly coupled to one or more actuators, the one or more actuators when activated collectively move the ripper from a starting position to a crustacean engagement position and then to a ripping complete position.

17. The crustacean butchering apparatus claim 16, wherein the ripper comprises a toothed blade for engaging the crustacean and movement of the ripper from the starting position to the ripping complete position moves the toothed blade in a non-linear path.

18. The crustacean butchering apparatus of claim 17, wherein the tail removing tool comprises a fence extending into the tail pulling slot, at least a portion of the fence is aligned with the ripper in the machine direction.

19. The crustacean butchering apparatus of claim 16, wherein the slot proximal side is defined by a pinching bar.

20. A crustacean butchering apparatus comprising:
- at least one carapace grip, each carapace grip of the at least one carapace grip sized to secure a carapace of a crustacean to a conveyor, when activated the conveyor carries the crustacean secured by the carapace grip in a machine direction along a processing path; and
- a tail removing tool positioned along the processing path, the tail removing tool having:
  - a tail pulling slot extending in the machine direction from an upstream slot end to a downstream slot end and having a slot height sized to pinch the crustacean between the tail and the carapace,
    the slot height being transverse to the machine direction and a cross-machine direction,
    the slot height measured from a slot proximal side to a slot distal side, the slot proximal side being closer to the conveyor than the conveyor is to the slot distal side,
    a distance between the slot proximal side and the conveyor increases between the upstream slot end and the downstream slot end,
  when activated the tail removing tool separates a tail of the crustacean from the carapace of the crustacean.

\* \* \* \* \*